United States Patent [19]

Intlekofer et al.

[11] 4,392,137
[45] Jul. 5, 1983

[54] RADAR SYSTEM

[75] Inventors: Michael J. Intlekofer, Bellevue; Jay R. Hanson, Seattle; Thomas E. Lee, Bothell, all of Wash.

[73] Assignee: Western Marine Electronics, Inc., Seattle, Wash.

[21] Appl. No.: 218,805

[22] Filed: Dec. 22, 1980

[51] Int. Cl.$^3$ .................. G01S 13/00; G01S 13/10; H01Q 3/00

[52] U.S. Cl. .................. 343/5 SC; 340/707; 340/709; 340/729; 343/5 VQ; 343/5 EM; 343/11 R; 343/757; 343/758; 343/763; 343/766

[58] Field of Search .......... 343/5 VQ, 5 EM, 5 SC, 343/11 R, 757, 758, 763, 766; 340/707, 709, 729

[56] References Cited

U.S. PATENT DOCUMENTS

| | | | |
|---|---|---|---|
| 2,705,792 | 4/1955 | Harris, Jr. | 343/766 |
| 2,716,234 | 8/1955 | Lester et al. | 343/11 R |
| 2,780,805 | 2/1957 | Gutton | 343/11 R |
| 3,212,086 | 10/1965 | Robinson | 343/5 EM |
| 3,614,787 | 3/1971 | Hart | 343/11 R |
| 3,646,557 | 2/1972 | Scheer | 343/11 R |
| 3,728,725 | 4/1973 | Bauer | 343/5 EM |
| 3,793,481 | 2/1974 | Ripley et al. | 340/707 |
| 3,810,174 | 5/1974 | Heard et al. | 343/5 VQ |
| 3,944,988 | 3/1976 | Mayer | 340/707 |
| 4,281,326 | 7/1981 | Anderson | 343/5 EM |

*Primary Examiner*—S. C. Buczinski
*Attorney, Agent, or Firm*—Seed, Berry, Vernon & Baynham

[57] ABSTRACT

A radar system for continuously displaying target returns on a conventional television receiver. The radar includes a console connected to a rotating scanner unit through conventional slip rings. The scanner unit contains a radar antenna coupled to a receiver and transmitter, and a power supply generating a multitude of high-voltage and circuit supply voltages from AC power. A position transducer measures the rotary position of the scanner unit and triggers the transmitter as the scanner unit rotates. The return signal is thresholded to generate a video data signal, portions of which are sequentially stored in separate memory locations, each corresponding to a respective range. The set of video data in memory thus corresponds to targets within a predetermined range in a single direction. A processing unit then reads the video data, calculates the displayed position of the targets on the television receiver, and reads the display data into a display memory along with cursor, range marker, and alarm ring information. A light pen interfaces with the processing unit to set the positions of the cursor and alarm rings. The display memory thus contains a record of all illuminated points on the display. A cathode-ray tube controller sequentially transfers the data from the display memory into a shift register which generates a serial data stream that is mixed with appropriate vertical and horizontal synchronizing signals. The resulting data stream may be applied to an RF modulator which generates an RF signal that is compatible with conventional television receivers.

5 Claims, 28 Drawing Figures

CONTROL PROGRAM

CONTROL PROGRAM (CONTINUED)

CONTROL PROGRAM (CONTINUED)

LIGHT PEN FLOWCHART

LIGHT PEN FLOWCHART (CONTINUED)

LIGHT PEN FLOWCHART (CONTINUED)

SCAN SUBROUTINE

LINE COUNTING SUBROUTINE

RADAR SYSTEM

DESCRIPTION

1. Technical Field

This invention relates to radars, and more particularly, to a radar system which utilizes a rotating directional antenna and which continuously displays target information on conventional video monitors or television receivers.

2. Background Art

Radars have long been in common use in the aviation and marine fields for displaying target returns from aircraft, weather systems, vessels and land masses for purposes of navigation and safety. Marine radars and landbased aircraft radars generally utilize a rotating directional antenna coupled to an RF receiver and transmitter. The transmitter is periodically triggered to generate a burst of RF energy which is coupled to the antenna, and the RF energy reflected from a target is coupled from the antenna to the receiver, which detects the target return and displays it on the screen of a cathode-ray tube. Electrical connections from the rotating antenna and its associated circuitry to the remainder of the radar system are generally provided by slip rings. However, when the transmitter is not mounted in the rotating antenna housing, the transmitter must be connected to the antenna through a rotary RF coupler, which is fairly expensive, and it significantly attenuates the transmitted and received signals a variable amount as the antenna rotates. Attempts to dispense with rotary RF couplers and their attendant disadvantages have generally involved mounting the transmitter and receiver in the rotating antenna housing and connecting the transmitter and receiver to the remainder of the system. This presents two other problems. First, the electronics associated with the antenna, transmitter and receiver require a multitude of signals and electronic power of various voltages, thus necessitating the use of a large number of slip rings. It is usually undesirable to add additional slip rings because the antenna mounting structure can then become bulky and expensive. Second, radar transmitters are invariably powered with a relatively high voltage. Conventional slip rings are not able to conduct such high voltages without a great deal of arcing and resulant pitting of the rings. As a result, specially constructed and hence expensive high-voltage slip rings must be used. But even these slip rings are not entirely satisfactory, particularly in a harsh marine environment. Consequently, no technique has been found to connect a rotating antenna and its attendant electronics to a stationary console unit without using relatively expensive, rotary RF couplers or high-voltage slip rings along with a large number of conventional low-voltage slip rings.

The target returns detected by the receiver of conventional radar systems generally undergo relatively little processing before modulating the Z axis of a cathode-ray tube. The target indications appearing on the screen of such cathode-ray tubes are thus often difficult to see, both because of the low intensity of relatively weak returns as well as the speed at which such target indications disappear from the screen. Often, as adequately visible display can only be achieved by utilizing a relatively high transmitter repetition rate in order to increase the rate at which the target indications are written on the screen. Conventional radar systems thus typically generate between 80 and 3000 pulses per second. The transmission repetition rate for a given radial can only be increased by either increasing the rotational velocity of the antenna or decreasing the number of transmissions per revolution. However, decreasing the number of transmissions per revolution decreases the target resolution, particularly for distant targets. Increasing the rotational velocity of the antenna decreases the life of the antenna mounting bearings and the transmitter since the transmitter is only capable of generating a finite number of RF bursts. The disadvantages of increasing the transmitter repetition rate by increasing the rotational velocity of the antenna are not outweighed by any advantages other than increasing the visibility of the target returns on the screen of a cathode-ray tube since the targets normally do not change position very rapidly. The increased repetition rate is thus not needed to accurately track the targets.

Even though such cathode-ray tube displays for radars are extremely limited in performance, they nevertheless are extremely expensive, due principally to their relatively low sales volume as compared to consumer products of similar complexity, such as television receivers.

Another difficulty associated with conventional cathode-ray tube displays for radar systems is the difficulty of determining the position of targets. Generally, range rings are scribed on the screen of the cathode-ray tube and degree markers are scribed around the circumference of the screen. The range position of a target is thus estimated by interpolating the position of a target between adjacent range rings, and the angular position of a target is estimated by extending an imaginary line from the center of the screen through the target to the outer periphery of the screen. Such techniques are not very conducive to accuracy since they depend a great deal upon the ability of the radar operator. Also, while such systems may be capable of generating alarm rings at preset ranges in which an alarm is generated responsive to targets falling within the alarm ring, the position of the alarm ring is not conveniently adjustable.

Still another problem associated with conventional radar systems stems from the triggering source for the radar transmitter. The transmitters of conventional radar systems are generally periodically triggered at a fixed rate, and the rotation of the beam on the display is independently synchronized to the rotation of the antenna. Such systems are incapable of maintaining the display and antenna in synchronism over a wide range of antenna rotational velocities. Also, the transmitter is triggered at a fixed rate so that the number of pulses transmitted per antenna revolution can vary appreciably. In fact, if the antenna inadvertently contacts a fixed object which prevents continued rotation, the transmitter will still transmit pulses at the same rate.

Attempts to solve many of the shortcomings of conventional radars using cathode-ray tubes have relied upon digital technology. While these digital radars do, in fact, solve some of the aforementioned problems, they nevertheless fail to solve other problems and they sometimes create additional problems. For example, the continuous display pattern of a digital radar conveys no information concerning the instantaneous pointing angle of the antenna, even though it is often desirable to know such information.

DISCLOSURE OF THE INVENTION

It is an object of the invention to provide a radar system utilizing a rotating scanner unit having a directional antenna and associated electronics which does not utilize either high-voltage slip rings, a rotary RF coupler, or a large number of conventional slip rings for electrically connecting the scanner to a stationary console unit.

It is another object of the invention to provide a radar system which is capable of generating highly visible target indications on a cathode-ray tube screen without the need for a high transmitter repetition rate.

It is another object of the invention to provide a movable cursor on the screen of a cathode ray tube radar display and to provide a digital readout of the cursor's position in order to accurately identify the position of targets.

It is still another object of the invention to provide a radar system which easily allows alarm rings to be placed at any desired range.

It is a further object of the invention to provide a radar system in which the operation of the transmitter is controlled by the rotational position of the antenna to ensure synchronization between the antenna and radar display.

It is a still further object of the invention to provide a radar system which generates an output signal that is compatible with conventional television receivers and video monitors in order to minimize the cost of the radar display.

It is a further object of the invention to continuously display target indications on a cathode-ray tube while also displaying markers indicating the rotational position of the antenna.

It is a still further object of the invention to provide a radar system which records sets of target returns from a single direction, transfers the set of returns to a stable memory, and continuously displays the contents of the stable memory.

These and other objects of the invention are provided by a radar system having a scanner unit connected to a console unit through a small number of conventional low-voltage slip rings. The scanner unit includes a directional antenna, a transmitter for applying a burst of RF energy to the antenna responsive to a transmitter trigger signal, and a receiver coupled to the antenna for generating a video signal upon detecting RF energy reflected from targets. The scanner unit is continuously rotated, and its pointing angle is measured by a position transducer. Each time the transmitter is triggered, the video signals for the target returns are recorded in a first memory so that the memory contains binary signals corresponding to all targets within a predetermined range in a single direction. A processor then reads the contents of the first memory, calculates the position of each target on the screen of a cathode-ray tube, and generates for each target a video display signal and a respective memory address which identifies the location in a second memory corresponding to the location in a cathode-ray tube scan which places the targets at the calculated position on the screen. The second memory thus contains a complete record of all target returns recorded in addresses corresponding to their location in the scanning of the cathode-ray tube, which causes the targets to be correctly positioned on the screen. Since the target data is continuously recorded, a high transmitter repetition rate is not required to obtain easily viewable target indications on a cathode-ray tube, so the scanner unit may rotate at 12 RPM and the transmitter may produce only 72 pulses per second. A cathode-ray tube controller periodically causes the contents of the second memory to be applied to a video output port which may drive a conventional video monitor or an RF modulator which generates an output signal compatible with a conventional television receiver. Although the transmitter is powered by a relatively high voltage, the scanner unit avoids the use of high-voltage slip rings or a rotary RF coupler by utilizing a self-contained, high-voltage power supply in the scanner unit which generates the high voltage from low-voltage power applied to the scanner unit through a pair of conventional low-voltage slip rings. The power supply also generates a large number of diverse supply voltages required by the scanner unit components so that a large number of supply voltages are generated from a single supply voltage, thus minimizing the number of low-voltage slip rings required. The position transducer generates equally spaced pulses as the scanner unit rotates. These pulses are indirectly applied to the trigger input of the transmitter so that it is the actual rotation of the scanner unit which controls the transmitter. As a result, inadvertent slowing or even stopping of the scanner unit's rotation does not degrade the accuracy of target angle information on the radar display. The position transducer also generates a synchronizing pulse once each revolution of the scanner unit. The rotational position of the scanner unit can then be determined by applying the trigger pulses to a counter which is reset by the synchronizing pulse so that the contents of the counter indicate the rotational position of the scanner unit. The processing unit writes video display signals into the second memory at the proper addresses of the second memory which place a cursor on the screen of the cathode-ray tube. The position of the cursor is controlled by a light pen, and a digital display, which may be on the screen of the tube, indicates the exact position of the cursor. The cursor may also be moved to position alarm rings at any desired range. The processor moves the cursor by determining the location of a light detector mounted in the light pen which is positioned against the screen at the desired cursor location. The light detector's location in a direction perpendicular to the scan line is determined by counting the number of lines scanned before the light detector senses the scan. The position of the cursor in a given line is determined by shifting the cursor along the line in a search pattern until the light detector senses the cursor. As a result, high-speed light-sensing electronics capable of responding to the rapidly moving scan are not required.

BEST MODE FOR CARRYING OUT THE INVENTION

Figure 1:
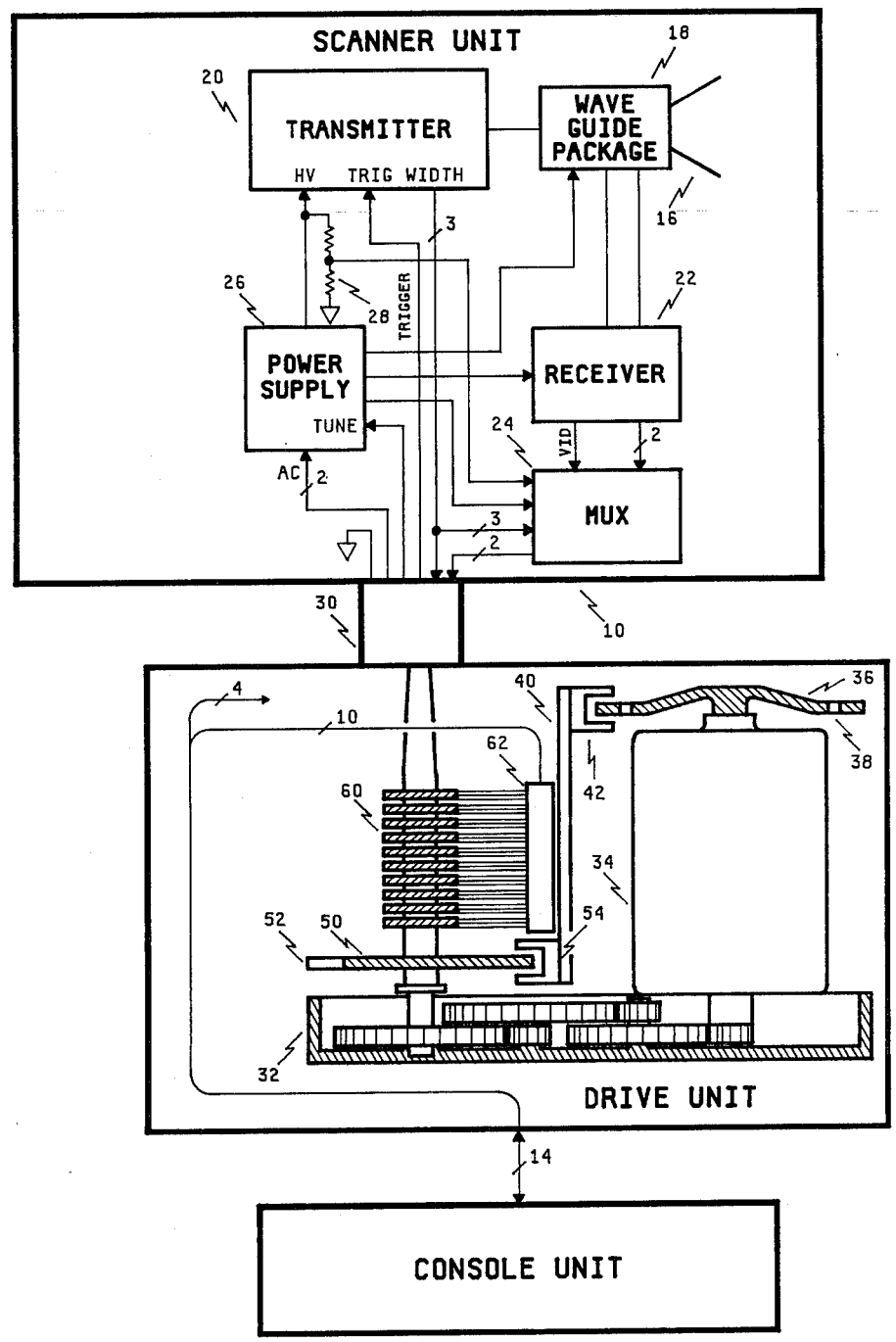
FIG. 1 is a block diagram of the radar system.

A block diagram of the radar system, as illustrated in FIG. 1, includes a scanner unit 10 mounted on a rotatable drive unit 12 and electrically connected to a console unit 14. The scanner unit 10 and drive unit 12 are typically mounted on the mast, tower, or other outside location, while the console unit 14 is typically mounted in a building or on a vessel's bridge.

The scanner unit 10 includes a conventional directional antenna 16 on which is mounted a conventional magnetron and local oscillator 18. The magnetron 18 is selectively driven by a transmitter 20 to generate a burst of RF energy which is reflected by targets located in the direction of the pointing angle of the antenna 16. The reflected RF energy is coupled to a receiver 22 which generates a video signal having a magnitude which is proportional to the intensity of the received RF energy.

The transmitter 20 is powered by a relatively high voltage, as is common in the art, and it includes a trigger input for actuating the transmitter 20 and standby and pulse control inputs consisting of three lines carrying a binary code for selecting the width of the burst of RF energy and the operating mode of the system.

The video signal from the receiver 22 is applied to a multiplexer 24 along with two lines carrying respective signals indicative of the currents through a pair of mixer diodes and a fourth line indicative of the magnitude of the high voltage supplied to the transmitter 20. Operation of the multiplexer 24 is controlled by a binary code on three input lines to connect one of the four inputs to its output.

The local oscillator/magnetron 18, transmitter 20, receiver 22, and multiplexer 24 are powered by a self-contained power supply 26 mounted in the scanner unit 10. The components of the scanner 10 must be powered by several different supply voltages in addition to the high voltage for the transmitter 20. The power supply 26, by generating these voltages from a two-wire alternating current input, is able to supply a wide variety of voltages from merely two input lines. As explained in greater detail hereinafter, this greatly simplifies the task of making electrical connections from the stationary drive unit 12 to the rotating scanner unit 10. The high-voltage output of the power supply 26 is also applied to a voltage divider resistor 28 which generates a relatively low-voltage sample signal received by the multiplexer 24. Common binary control signals are applied to the width input of the transmitter 20 and the control input of the multiplexer 24. When the transmitter 20 is triggered, the three-bit binary signal controls the width of the radar pulse. At other times, the three binary signals control the operation of the multiplexer 24. Once again, this reduces the number of necessary electrical connections between the rotating scanner unit 10 and the stationary drive unit 12.

The drive unit 12 includes a shaft 30 on which the scanner unit 10 is mounted. The shaft 30 terminates in a transmission 32 having an input shaft connected to a conventional electric motor 34. The transmission 32 is of the reduction variety so that the motor shaft rotates a large number of revolutions for each rotation of the output shaft of transmission 32. In one operational embodiment, the transmission 32 has a 180:1 gear ratio.

The shaft of the motor 34 also carries a circular disc 36 having formed therein a pair of holes 38. The disc 36 is straddled by a conventional optical sensor 40 consisting of a light source 42 and an adjacent light sensor 44. The light source 42 and sensor 44 are positioned so that the disc 36 normally blocks the transmission of light from the source 42 to the sensor 44, except when the holes 38 are adjacent the sensor 40. The light sensor 44 thus produces two output pulses for each revolution of the motor 34. Since the gear ratio of the transmission 32 is 180:1, the optical sensor 40 produces one output pulse for each degree of rotation of the scanner unit 10. However, other designs generating fewer or greater pulses per revolution may also be used. As explained in greater detail hereinafter, these output pulses indirectly trigger the transmitter 20 so that the operation of the transmitter 20 is controlled by the actual position of the scanner unit 10. As a result, the radar system is maintained in synchronism with the scanner unit 10 over all rotational velocities of the scanner unit 10.

The lower end of the support shaft 30 carries a circular disc 50, which is substantially identical to the disc 36 except that it contains only a single hole 52. A second optical sensor 54, which is identical to sensor 40, straddles the disc 50 and thus produces one output pulse for each rotation of the scanner unit 10. The output pulse from the sensor 54 thus provides information each revolution of the actual position of the scanner unit 10.

The support shaft 30 carries a number of conventional low-voltage slip rings 60, equal in number to the eight signal lines from the scanner unit 10. The slip rings 60 slidably contact respective conductors of a conventional contact unit 62, preferably using brushes. The contact unit 62 is connected to the console unit 14 to provide electrical connection between the rotating scanner unit 10 and the remotely positioned console unit 14. The advantage of mounting the power supply 26 in the scanner unit 10 is now apparent. Placing the power supply in the console unit would necessitate the use of special high-voltage slip rings to supply the high voltage to the transmitter 20. Such high-voltage slip rings are not only expensive, but a harsh marine environment makes them somewhat unreliable. Additionally, the large number of different voltages used by the various components in the scanner unit 10 would require the use of substantially more than eight slip rings. Alternatively, mounting the transmitter 20 in the drive unit would require the use of an extremely expensive rotary microwave coupler. By mounting the power supply 26 in the scanner unit, only two power supply slip rings are required.

Figure 2A:
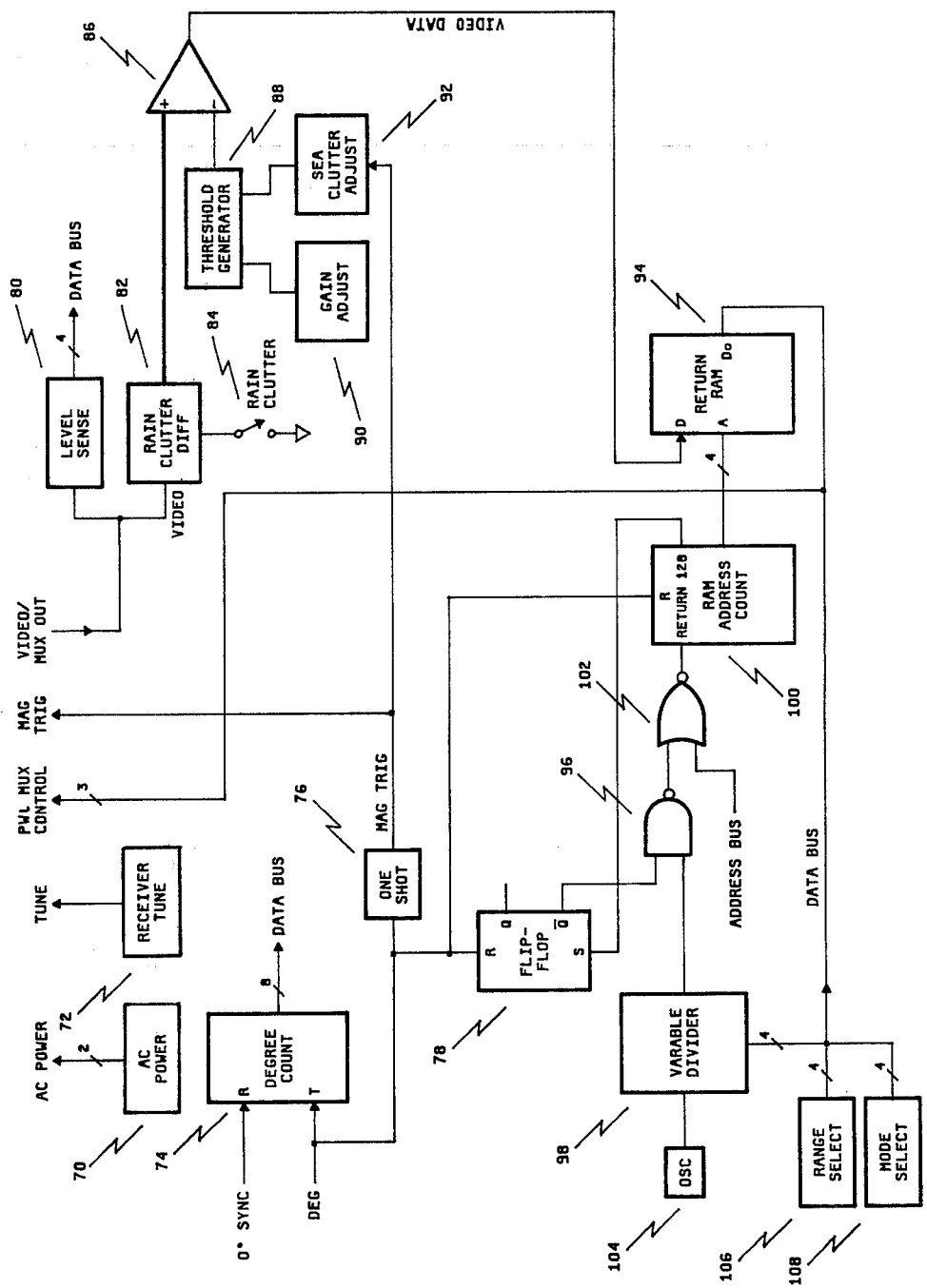
FIGS. 2a and 2b are detail block diagrams of the console unit of the radar system.
Figure 2B:
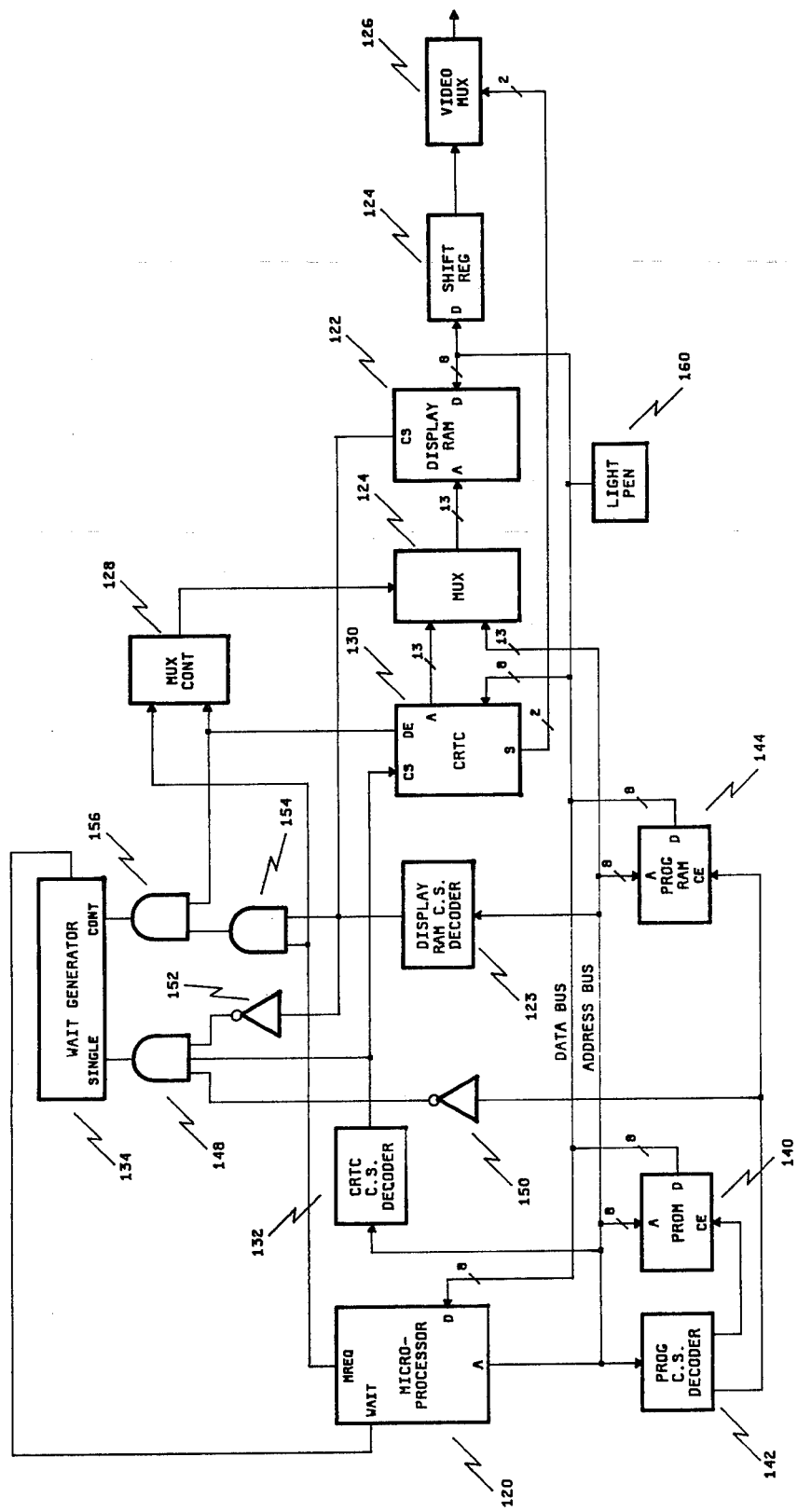

The console unit 14, as illustrated in FIG. 2, includes an AC power supply 70 for supplying AC power to the scanner power supply 26 and a manually actuated receiver tuner 72 for supplying a variable voltage to a microwave tuning diode in the scanner unit 10. The degree pulses from the optical sensor 40 are applied to the clock input of a counter 74 which is reset by the zero degree sync pulse from optical sensor 54. The nine-bit output of the counter 74 thus indicates the rotational position of the scanner unit 10.

The degree pulses from the optical sensor 40 are also applied to a one-shot 76 which generates a fixed-duration pulse in response thereto which is applied to the trigger input of the transmitter 20. Thus, as explained above, the transmitter 20 is controlled by the physical rotation of the scanner unit 10. The degree pulses are also applied to the reset terminal of a flip-flop 78 which assists in regulating the amount of return target data processed, as explained in greater detail hereinafter.

During operation, the three-bit multiplex control signals connect the output of the multiplexer 24 (FIG. 1) to the video output of the receiver 22. The video signals are applied to a level-sensing circuit 80 which generates a four-bit output indicative of the average intensity of the video signal from the receiver 22. The video signal from the receiver 22 is also applied to a rain-clutter differentiating circuit 82, enabled by closing a rain-clutter switch 84. Basically, the output of the rain-clutter differentiator 82 is normally proportional to the intensity of the reflected RF energy. However, in the presence of rain, RF energy is continuously reflected, thus making it more difficult to detect reflections from targets. Accordingly, when the rain-clutter switch 84 is closed, the output of the rain-clutter differentiator 82 is proportional to the differential with respect to time of the video signal from the receiver 22. In this mode, the differentiator 82 responds essentially to variations in the intensity of the reflected RF energy, thus facilitating detection of small increases in received energy reflected from targets.

The output of the rain-clutter differentiator 82 is applied to one input of a comparator 86. The other input of the comparator 86 receives a comparison signal from a threshold generator 88 in accordance with signals generated by a gain-adjustment circuit 90 and a sea-clutter adjusting circuit 92. Basically, the gain-adjusting circuit generates a manually adjustable voltage which raises the amplitude of the comparison signal applied to the comparator 86 as gain is reduced. Thus a high gain adjustment generates a relatively low comparison signal so that an output is generated from the comparator 86 for relatively low-intensity returns. The sea-clutter adjusting circuit 92 causes the comparison signal to exponentially decrease from a relatively large value as soon as the transmitter or magnetron trigger pulse is generated. The sea-clutter adjusting circuit 92 thus makes the gain of the receiver circuit relatively low for close targets but substantially greater for more distant targets in accordance with the physical property that reflections are more distant targets are lower in intensity. The degree to which the gain is reduced upon the occurrence of the magnetron trigger pulse may be manually adjusted, depending upon sea conditions, so that an output is not generated by the comparator 86 from reflections from the ocean as opposed to reflections from targets. The video data signal from the comparator 86 is applied to a data input of a random access memory (RAM) 94 and recorded in an address location selected by an eight-bit address bus, as explained in greater detail hereinafter.

Upon the occurrence of each degree pulse from the optical sensor 40 (FIG. 1), flip-flop 78 is reset, as explained above. The Q output of flip-flop 78 thus goes high, thereby enabling NAND-gate 96. A pulse train from a variable divider circuit 98 is then applied to a RAM address counter 100 through NAND-gate 96 and NOR-gate 102. The counter 100, which is reset by each degree pulse, then begins incrementing from zero so that successive address locations are selected in the return RAM 94. Video data from comparator 86 representing returns from targets of successively increasing distance are thus recorded in the return RAM 100 in sequential address locations.

When the counter 100 increments to a predetermined number, such as 128, flip-flop 78 is set, thereby disabling NAND-gate 96 and terminating the recording of video data signals from the comparator 86. The return RAM 94 thus records a specific number of video data signals, as determined by the address counter 100.

The variable divider circuit 98 is driven by a signal from a highly accurate oscillator 104. The frequency of the oscillator 104 as divided by the divider circuit 98 determines the distance of targets from which returns are recorded since the video data signals are written into a fixed number of memory locations and the duration of the recording process is determined by the frequency of the signal from the divider circuit 98. The divider ratio of divider circuit 98 is manually selected by a range-selector circuit 106 which generates a four-bit signal that is indirectly applied to the four-bit control input of the divider circuit 98. A mode-select circuit 108 also applies a four-bit word to a data bus in order to manually select the operating mode, as explained in greater detail hereinafter.

The operation of the console unit 14 is controlled by a microprocessor 120 operating in accordance with a program of instructions. After the video data signals for all targets within a predetermined range in a single direction have been read into the return RAM 94, the microprocessor 120 reads the data from the RAM 94 by generating pulses on one line of the address bus which are applied to NOR-gate in order to increment the RAM address counter 100. As bits of data from successive addresses of RAM 94 are presented to the data bus, the microprocessor 120 checks each bit for the presence of a video data signal. The microprocessor 120 then calculates the position of the target corresponding to the video data signal and determines the proper location of a video display signal in the scan of a cathode-ray tube which will place the target at the proper position on the screen of the cathode-ray tube. In other words, a target at zero degree and the maximum range should be displayed at the upper center of the cathode-ray tube screen. In a video scan, the video display signal for that target should occur in the middle of the scan for the first line, assuming a conventional line scan from left to right and frame scan from top to bottom. A target located at ninety degrees and the maximum range would be displayed at the right edge of the screen, midway between the top and bottom. In order to position the target in this location, the video display signal would occur at the end of scanning the middle line of the screen. In this manner, the microprocessor 120 first determines the location of the target on the screen and then determines where in the video scan a video display signal should be generated to position the target at the proper location. The microprocessor 120 then writes a video display signal into a memory address of a display RAM 122 which corresponds to the proper location of the video display signal. For example, a video display signal would be written into the first address of display RAM 122 in order to position a target at the upper lefthand corner of the screen. A video data signal would be written into the last address of display RAM 122 in order to position a target at the lower righthand corner of the screen.

In actuality, the RAM 122 records eight data bits in each memory location, corresponding to eight sequentially ordered portions of the video scan. When video display signals are being written into the display RAM 122, the address is generated by the microprocessor 120 on the address bus and is transmitted through a multiplexer 124 which operates in accordance with a multiplexer control circuit 128. The display RAM 122 thus contains a record of all targets in the form of video display signals recorded in memory locations corresponding to the portions of the video scan which will place the targets at the proper location on the screen. The target information recorded in the display RAM 122 is then repetitively updated as target information for each angle is successively read out of the return RAM 94.

The video display signals in the display RAM 122 are applied eight bits at a time to a shift register 124 which then generates a serial data stream for modulating the Z axis of the cathode-ray tube during the video scan. The data stream is combined in a video multiplexer 126 with horizontal and vertical sync signals generated by circuit 130 to initiate the scanning of successive lines each horizontal sync pulse and to begin a new scan each vertical sync pulse. The output of the video multiplexer 126 may be applied to a conventional video monitor or to an RF modulator which generates a signal that is compatible with conventional television receivers. The system thus does not require specially constructed video displays.

While the microprocessor 120 controls the writing of video display signals into the display RAM 122, the video display signals are read out of the RAM 122 by a cathode-ray tube controller 130 which operates asynchronously with the microprocessor 120. Basically, the cathode-ray tube controller (CRTC) 130 is an integrated circuit available from Motorola Semiconductors which is programmed to generate successive addresses on an thirteen-bit address bus and appropriately timed horizontal and vertical sync signals. The microprocessor 120 initially programs the CRTC 130 by generating an appropriate address on the address bus which is decoded by a CRTC chip-select decoder 132. The microprocessor then sequentially generates on the data bus appropriate signals to record data in internal registers of the CRTC 130 so that the CRTC 130 generates vertical and horizontal sync signals after a preset number of address increments.

The microprocessor 120, being required to quickly handle a large amount of data, operates at a relatively high speed. Certain components with which the microprocessor 120 must interface are not capable of operating at the operating speed of the microprocessor 120. Consequently, a wait-generator circuit 134 is used to generate a wait signal which suspends operation of the microprocessor 120 for a period. Under these circumstances, the wait-generator circuit 134 has the effect of increasing the length of an instruction to allow the components interfacing with the microprocessor 120 sufficient time to handle the instruction. Basically, the wait sequence is initiated whenever the microprocessor 120 generates a memory request unless the device associated with the memory request is capable of opperating at sufficient speed. One relatively slow device accessed by the microprocessor 120 is a programmable read-only memory (PROM) 140 which contains the program instructions for controlling the operation of the microprocessor 120. In order to increase the operating speed of the microprocessor 120, the microprocessor 120 initially reads the instructions from the read-only memory 140 by generating an appropriate address on the address bus which is decoded by the program chip-select decoder 142 to generate a chip enable for the PROM 140. The address but also designates the proper address for each instruction. After reading out each instruction from the PROM 140, the microprocessor 120 generates an appropriate address which is decoded by the chip-select decoder 142 to generate a chip enable for a program RAM 144 and the instruction is read into the program RAM 144. After all of the instructions have been transferred from the PROM 140 to the program RAM 144, the microprocessor 120 utilizes the instructions in the RAM 144 and thereby benefits from the faster speed of the RAM 144.

A memory request (MREQ) occuring when instructions are to be read out of the PROM 140 causes a high to be applied to OR-gate 146 which applies a high to AND-gate 148. Insofar as the chip enable for RAM 144 is low, the output of inverter 150 is also high. Also, the output of display RAM chip-select decoder 123 will also be low (since the memory request is for PROM 140) so that the output of inverter 152 is also high. AND-gate 148 thus triggers the single wait input to the wait generator 34 in order to suspend operation of the microprocessor 120 for a short period. Similarly, a memory request generated to program the CRTC 130 also triggers the single-wait input of the wait-generator circuit 134. A memory request generated to read an instruction from the program RAM 144 does not trigger the wait generator 134 since the high applied to the chip-enable input of RAM 144 disables AND-gate 148 through inverter 150. Similarly, a memory request generated to access the display RAM 122 does not trigger the wait-generator circuit 134 since the output of the display RAM chip-select decoder 123 disables AND-gate 148 through inverter 152.

The wait-generator circuit 134 also suspends operation of the microprocessor 120 when the microprocessor 120 attempts to access the display RAM 122 while the display ram 122 is being accessed by the CRTC 130. A memory request generated by the microprocessor 120 to access the display RAM 122 applies a high to AND-gate 154, which is enabled because of the high generated by display RAM chip-select decoder 123. When the cathode-ray tube controller circuit 130 is accessing the display RAM 122, its display-enable (DE) output is high, thereby triggering the continuous-wait input to the wait-generator circuit 134 through enabled AND gate 156. The wait-generator circuit 134 then suspends operation of the microprocessor 120 during the entire time that the CRTC 130 is accessing the display RAM 122. The microprocessor 120 may, of course, perform other functions while the CRTC 130 is accessing the display RAM 122 as long as it does not also attempt to access the display RAM 122. The high at the display-enable output of cathode-ray tube controller 130 is also read by the multiplex control circuit 128 to connect the address bus of the cathode-ray tube controller to the address bus of the display RAM 122. The radar system also includes a light pen 160 which, as explained in greater detail hereinafter, is used to control the position of a cursor on the screen of the cathode-ray tube. A digital readout of the cursor's position is generated by the radar system in order to determine the exact range and bearing of targets and to accurately position alarm rings.

Figure 3:
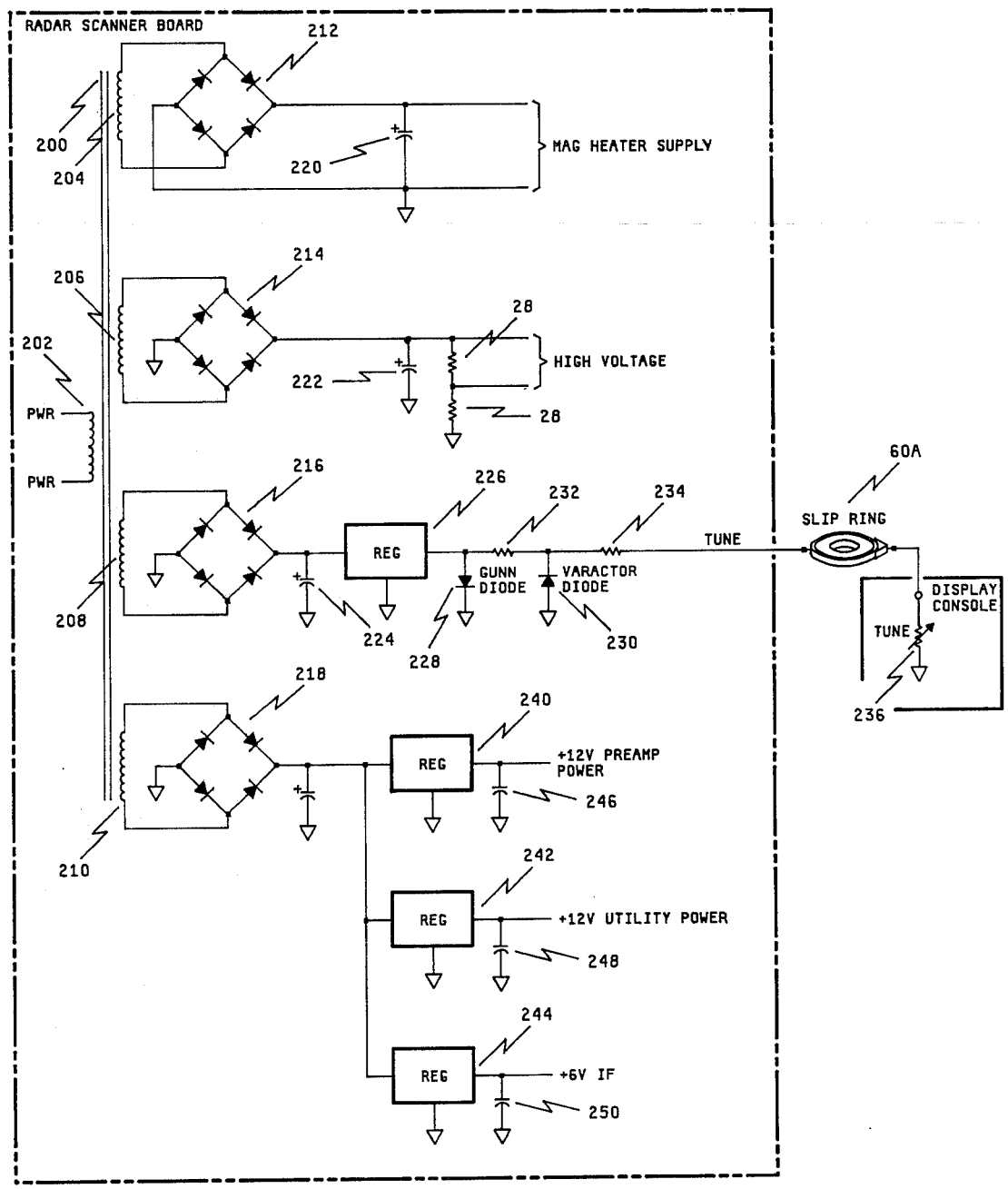
FIG. 3 is a schematic of a power supply contained in the scanner unit of the radar system.

A schematic of the power supply 26 of the scanner unit 10, as illustrated in FIG. 3, includes a power transformer 200 receiving AC power through its primary winding 202. The transformer 200 includes four separate secondary windings 204,206,208,210. Each of the secondary windings 204–210 is connected to a respective full-wave rectifier 212–218. The output of the first bridge 212 is averaged by a filter capacitor 220 and used to power the heater of a magnetron.

The output of the second rectifier 214 is also applied to a filter capacitor 222, and it supplies high voltage to the transmitter 20. The voltage divider resistors 28 provide a reduced-voltage sample signal which, as explained in reference to FIG. 1, is applied to the multiplexer 24 for sampling by the console unit 14.

The output of the third rectifier 216 is averaged by a filter capacitor 224 and connected to a conventional voltage regulator 226. The output of the voltage regulator 226 is applied to a gunn diode 228 which is mounted in a microwave cavity resonator but illustrated as part of the power supply 26 for clarity of illustration. The gunn diode 228 generates a local oscillator signal having a frequency which is primarily determined by the dimensions of the cavity resonator. The output of the voltage regulator 226 is also applied to a varactor diode 230 through resistor 232, which is connected in parallel with a series combination of a resistor 234 and potentiometer 236. The potentiometer 236 is mounted in the console unit 14, but is illustrated as part of the power supply 26 for clarity of illustration. The potentiometer 236 is connected to the resistor 234 through a slip ring 60a. The varactor diode 230 has a capacitance which varies in accordance with the voltage across it, which is adjusted by varying the resistance of potentiometer 236. As varactor diode 230 is mounted with the gunn diode 228 in the microwave cavity resonator, variations in its capacitance have the effect of pulling the frequency of the local oscillator in either direction in order to tune the receiver to the exact frequency of the reflected RF energy.

The last rectifier 218 is applied to three voltage regulators 240,242,244, each of which has an output connected across a respective filter capacitor 246,248,250. The regulator 240 supplies power to a preamplifier in the receiver 22, the regulator 242 is used for a variety of purposes, and the regulator 244 supplies power to a high-gain logarithmic amplifier in the receiver 22. As emphasized above, the self-contained power supply 26 in the scanner unit 10 generates all of these different supply voltages as well as a high voltage for the transmitter 20 while requiring only two slip rings for receiving power.

Figure 4:
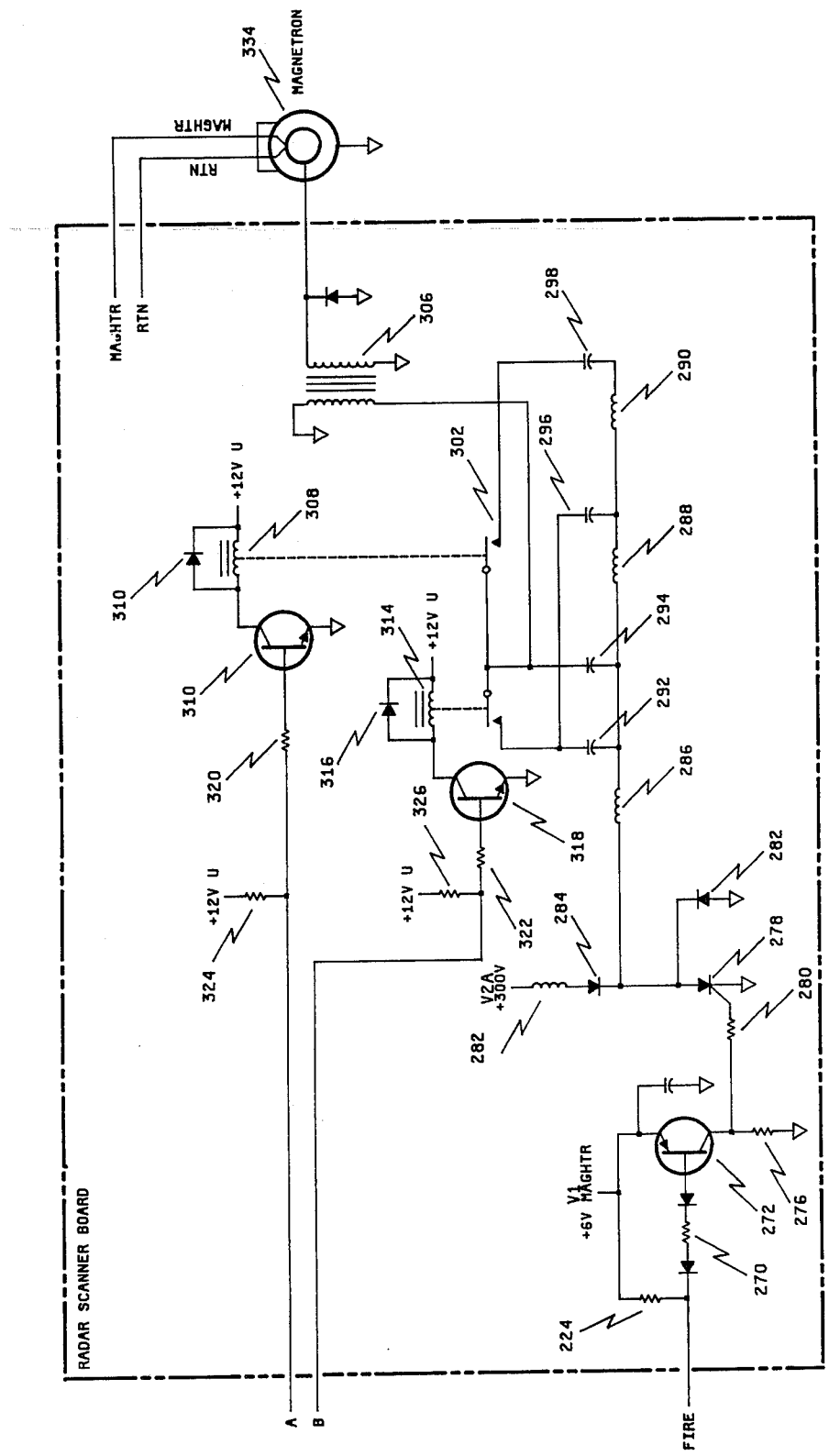
FIG. 4 is a schematic of a radar transmitter contained in the scanner unit.

The transmitter 20 in the scanner 10, as illustrated in FIG. 4, receives the magnetron trigger signal from the console unit 14 to apply a radar pulse of RF energy to the antenna 16. The negative-going magnetron trigger signal is applied through resistor 270 to the base of transistor 272, which is normally held at cutoff by resistor 274 connected to the magnetron heater supply voltage V1. The magnetron trigger pulse turns transistor 272 on, thereby applying a positive-going pulse across resistor 276, which triggers an SCR 278 through resistor 280. Diode 282 is connected across the SCR 278 to protect it from excessive reverse biasing voltages.

When the SCR 278 is fired, a choke 282 is charged by current flowing from the high-voltage supply V2a through the choke 282, diode 284 and SCR 278. At the end of the trigger pulse, the SCR 278 opens, thereby causing the choke 282 to produce a large reverse voltage which is applied to a pulse-forming network consisting of inductors 286,288,290, capacitors 292,294,296,298 and relay contacts 300,302, as well as the primary 304 of a transformer 306. The relay contact 300 is controlled by a relay coil 308 having a protective diode 310 in parallel with a transistor 312 in series. Similarly, contact 302 is controlled by a relay coil 314 which is connected in parallel with a protective diode 316 and in series with a transistor 318. The base of transistor 312 is connected to the first bit of the control bus for the multiplexer 24 through resistor 320, while the base of transistor 318 is connected to the second bit of the control bus through resistor 322. All three bits of the control bus are normally held high through respective pull-up resistors 324,326,328. Transistors 312,318 are turned on to close respectively relay contacts 300,302 in order to connect or disconnect the capacitors and inductors mentioned above in the pulse-forming network in order to vary the duration of the discharge of the choke 282 at the termination of the magnetron trigger pulse. The signals on the control bus are generated by the microprocessor 120 in the console unit 14, depending upon the range selected on the console unit 14.

Regardless of the duration of pulse selected, the pulse generated across the primary winding 304 generates a greatly increased voltage across a pair of secondary windings 330,332 of transformer 306. The secondary windings 330,332 are accurately wound so that the induced voltages are equal to each other. The differential voltage between the windings 330,332 thus approaches zero. Consequently, the magnetron heater supply voltage V1 can be applied through the windings 330,332 without excessively increasing the voltage across the heater. However, a large voltage is generated across the secondary windings 330,332, thereby applying a large voltage to the magnetron 334. The magnetron 334 then generates a burst of RF energy which is applied to the antenna 16 (FIG. 1). The magnetron 334, mixer diodes 350,352, gunn diode 228 and varactor diode 230, as well as their associated microwave cavities and waveguides, are commercially available and are thus not illustrated in detail herein.

Figure 5:
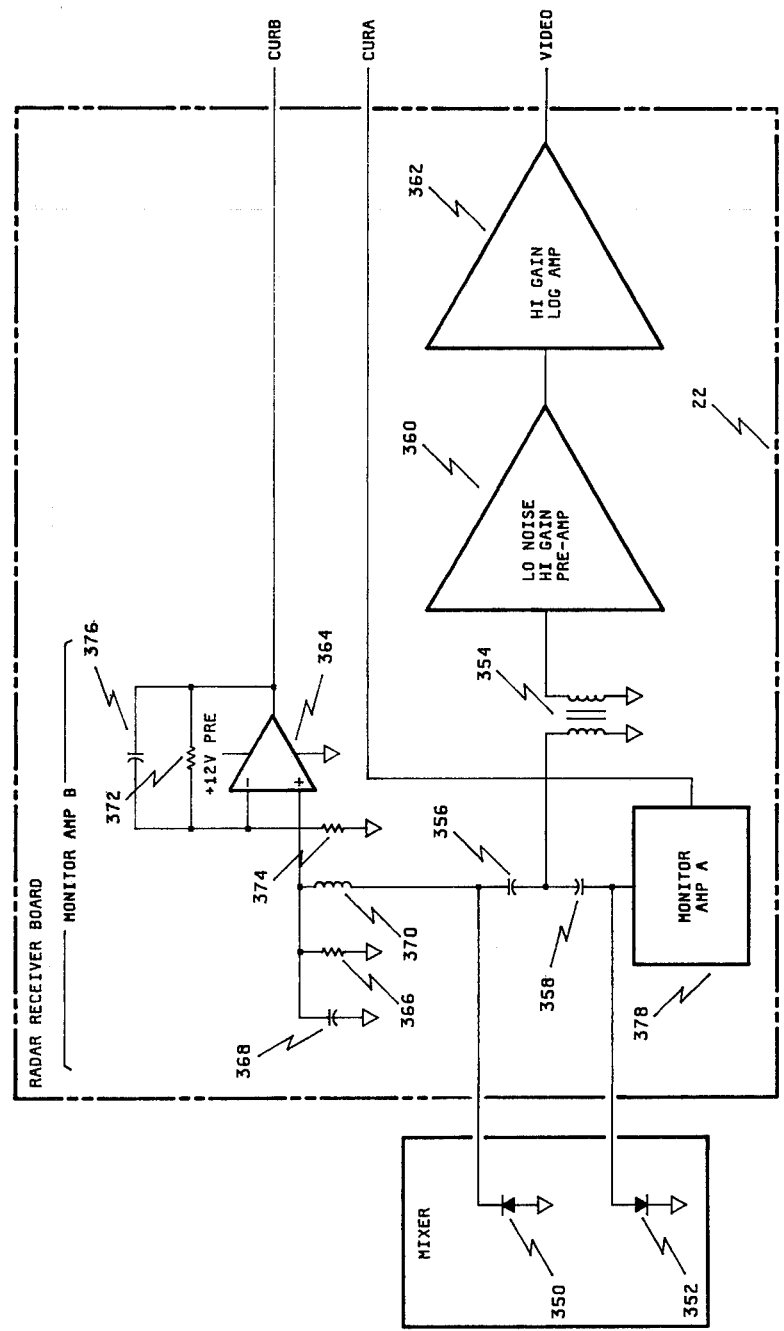
FIG. 5 is a schematic of a receiver unit contained in the scanner unit.

The RF energy reflected from targets is detected by a pair of mixer diodes 350,352, illustrated in the receiver schematic of FIG. 5. In actuality, the mixer diodes 350,352 are mounted in the antenna 16 but are illustrated as part of the receiver 22 for clarity of illustration. The mixer diodes 350,352 also receive the local oscillator signal from the gunn diode 228 so that the detected output from the mixer diodes 350,352 has a frequency equal to the difference in frequency and the local oscillator frequency. The cathode of diode of 350 and anode of diode 352 are coupled to an impendance transformer 354 through respective capacitors 356,358. A conventional low-noise, high-gain amplifier 360 receives the signal from the transformer 354 and applies it to a conventional high-gain logarithmic amplifier 362 having an IF band pass centered around the frequency of interest. The logarithmic characteristics of amplifier 362 provide amplitude compression so that the system is capable of processing target returns over a greater dynamic range. The output of the amplifier 362 is a video signal which is applied to the console unit 14 through the multiplexer 24.

The local oscillator signal detected by the mixer diode 350 produces a small negative voltage across diode 350. This voltage is applied to the non-inverting terminal of an operational amplifier 364 and a low-pass filter formed by resistor 366 and capacitor 368 through resistor 370. The resistance ratio between feedback resistor 372 and resistor 374 sets the gain of amplifier 364 at a high value, while capacitor 376 reduces the high frequency response of the amplifier 364. The output of amplifier 364 is thus an indication of the intensity of the local oscillator signal. A similar circuit 378 is used to generate a voltage which is proportional to the local oscillator signal being detected by the diode 352. These voltages are applied along with the video signal at the output of amplifier 362 and the high-voltage sample signal V2b to the multiplexer 24, which, selects one of the signals for transmission to the console unit 14. As explained hereinafter, the voltage generated by the diodes 350,352 is displayed to allow the capacitance of the varactor diode 230 to be adjusted to tune the local oscillator for maximum signal intensity.

Figure 6:
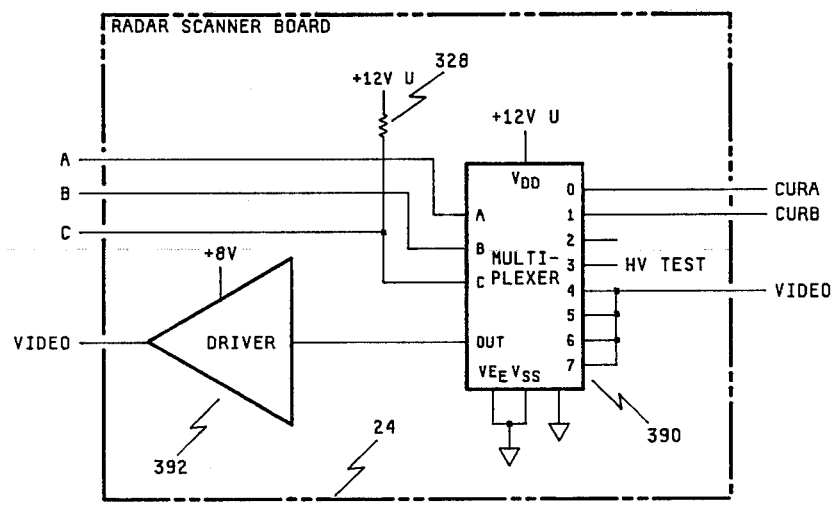
FIG. 6 is a schematic of an output signal multiplexer contained in the scanner unit.
Figure 7A:
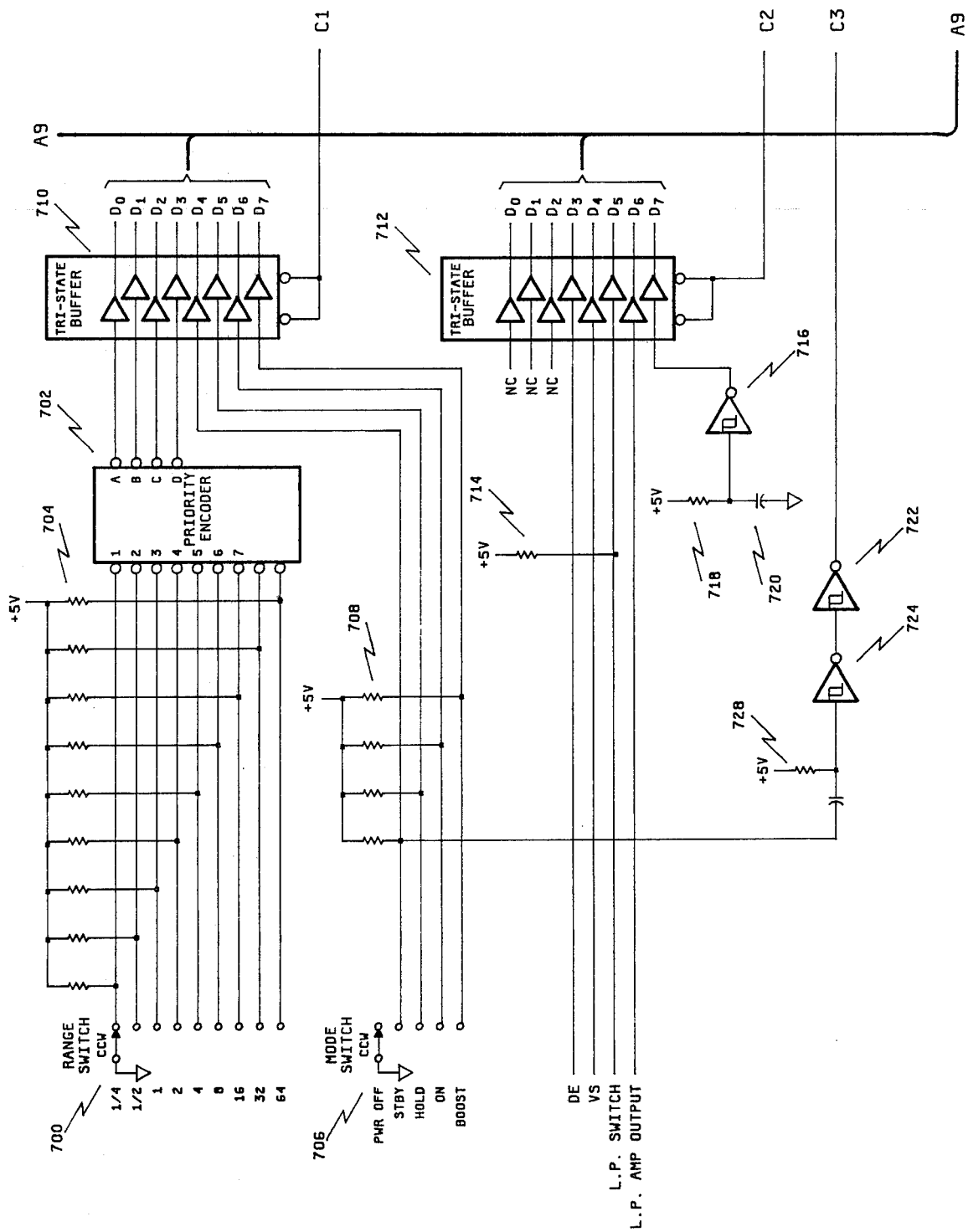
FIGS. 7a–7k comprise a schematic of signal-processing circuitry in the console unit of the radar system.
Figure 7B:
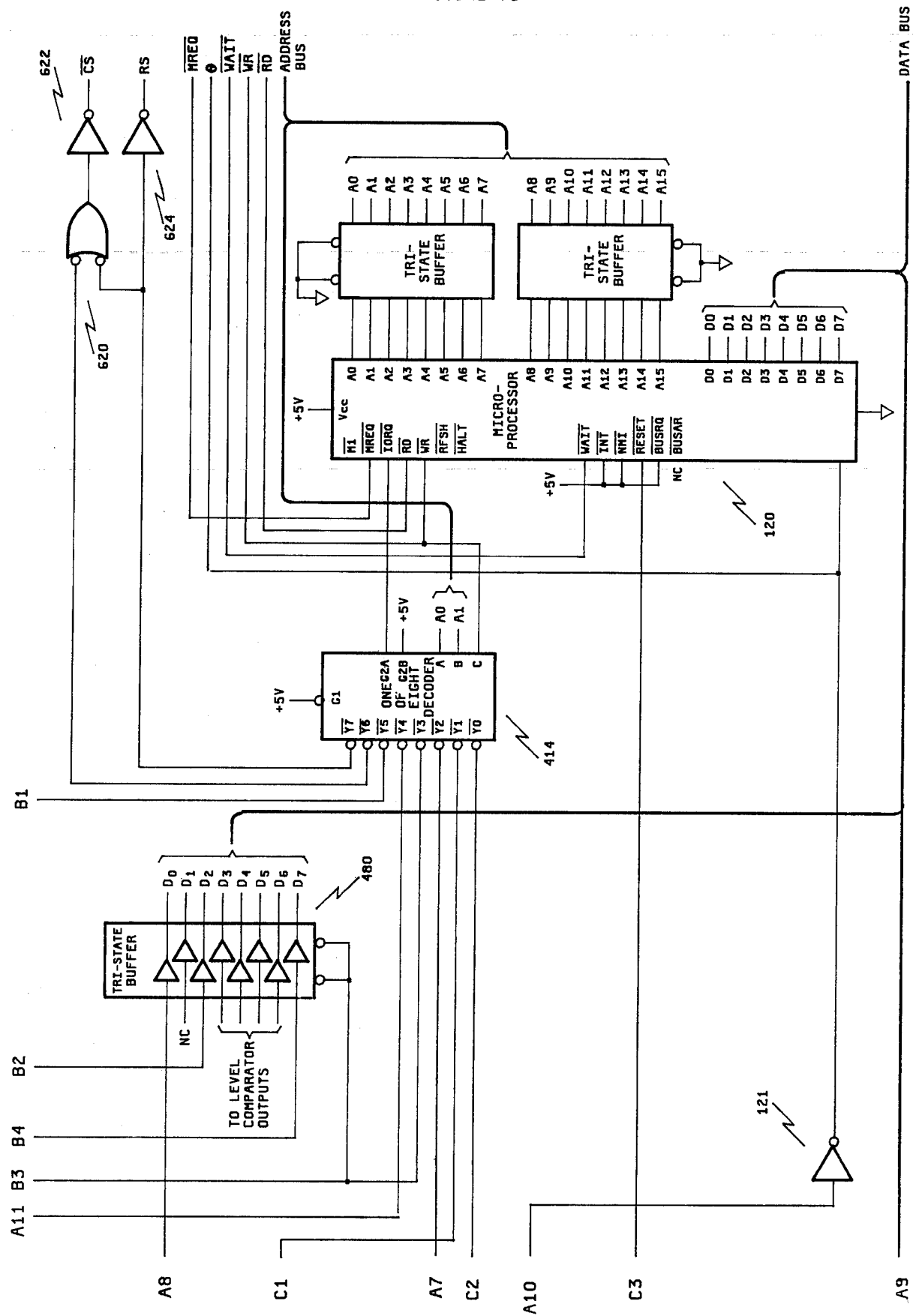
Figure 7C:
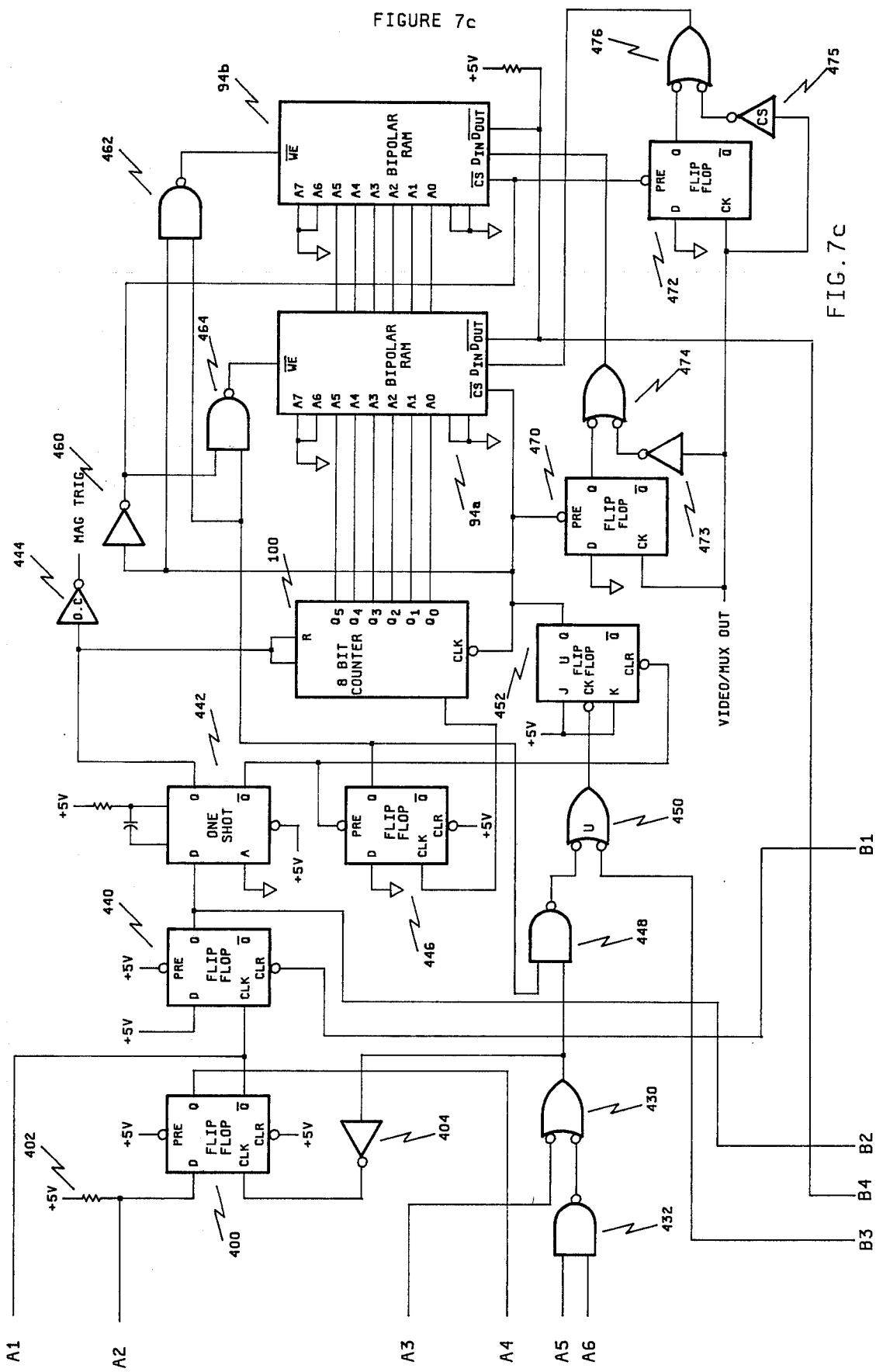
Figure 7D:
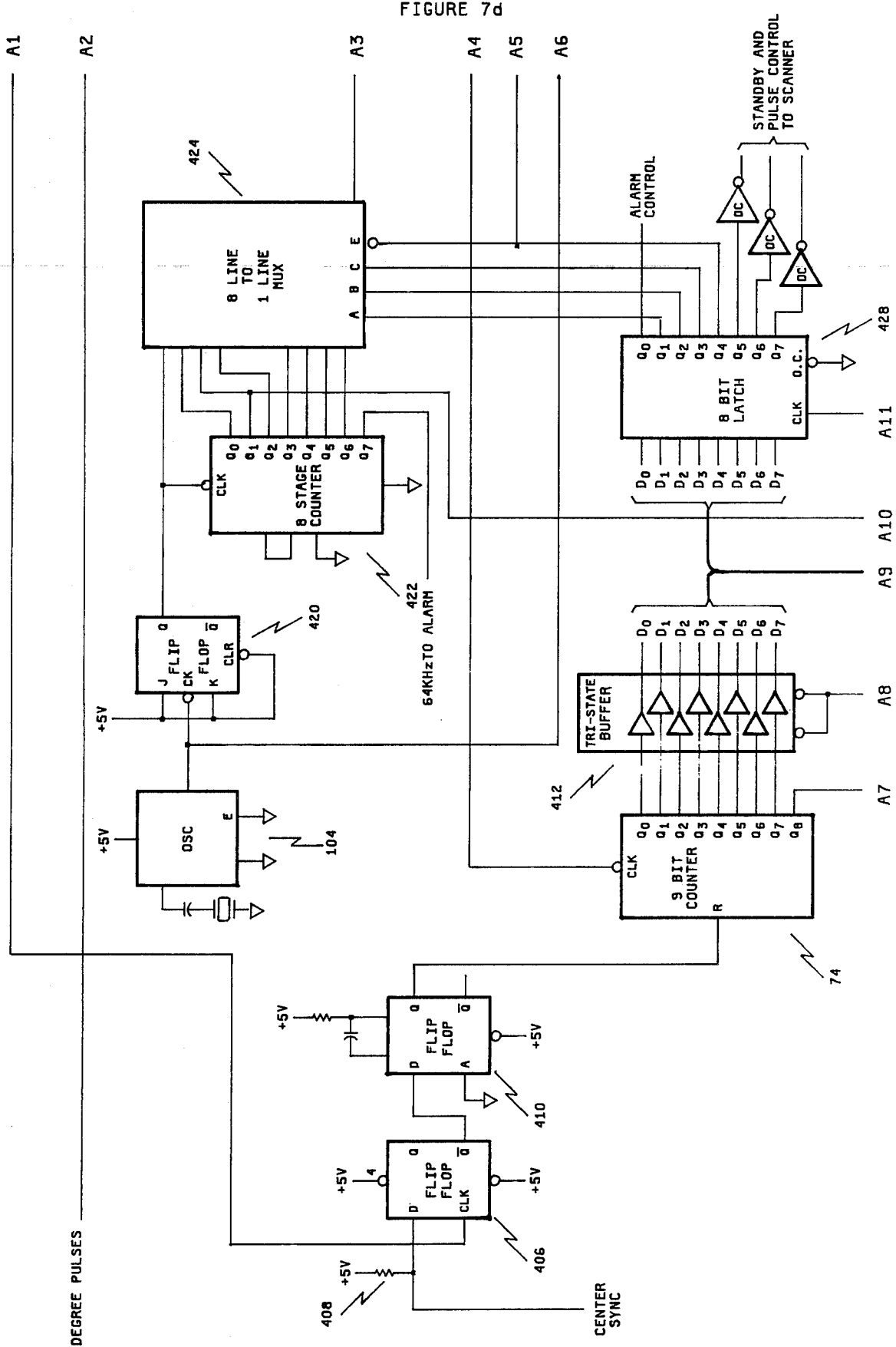
Figure 7E:
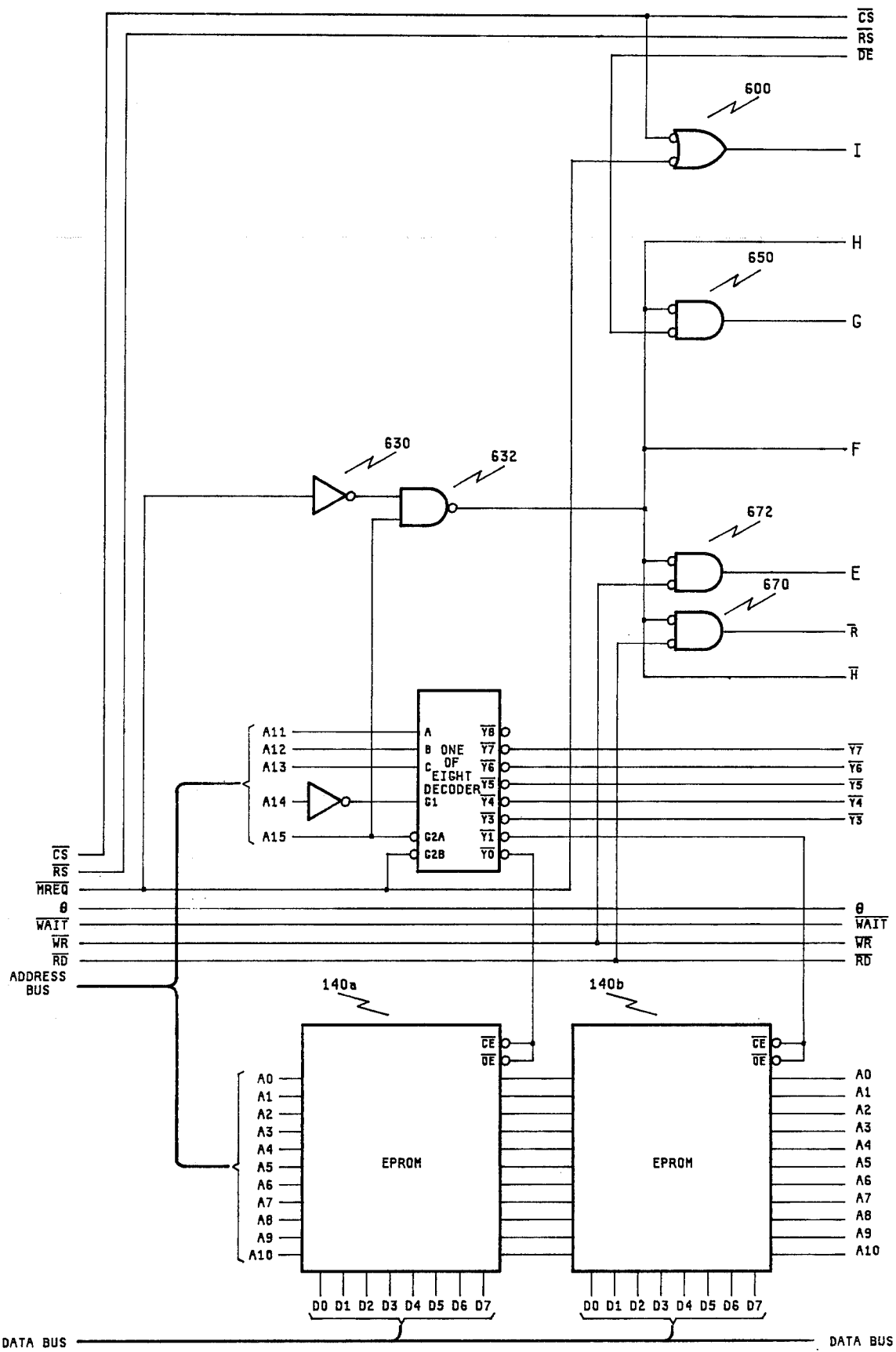
Figure 7F:
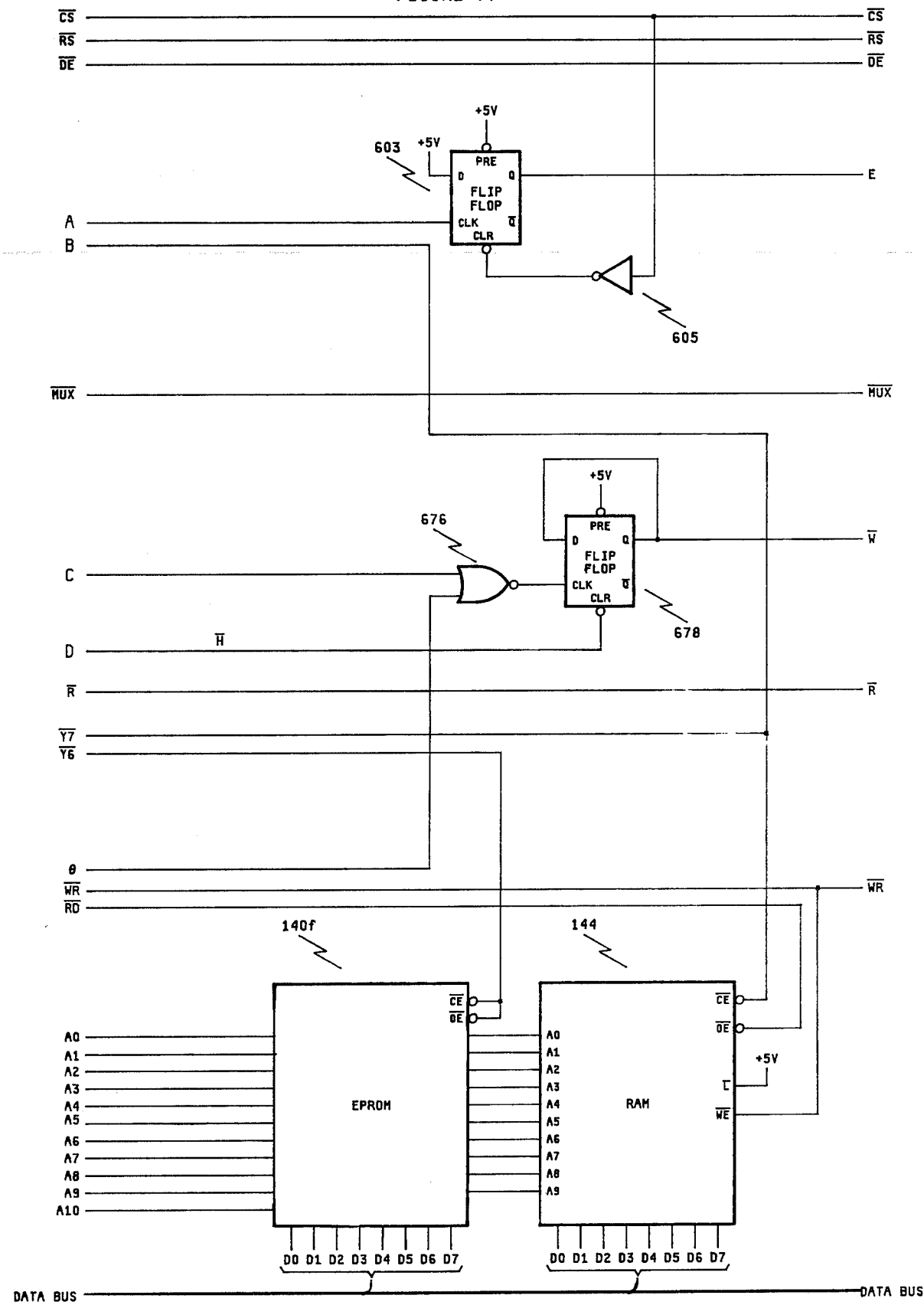
Figure 7G:
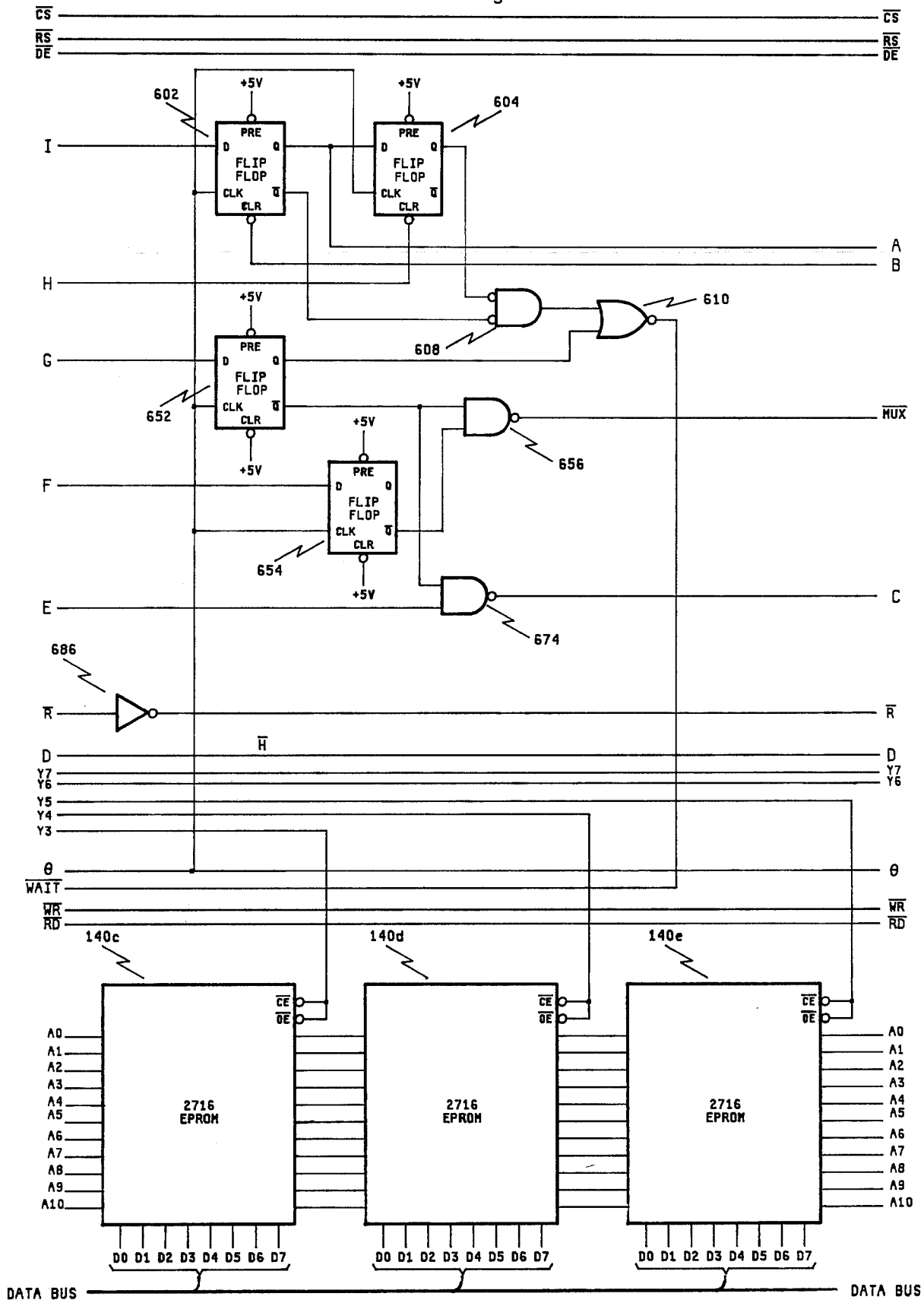
Figure 7H:
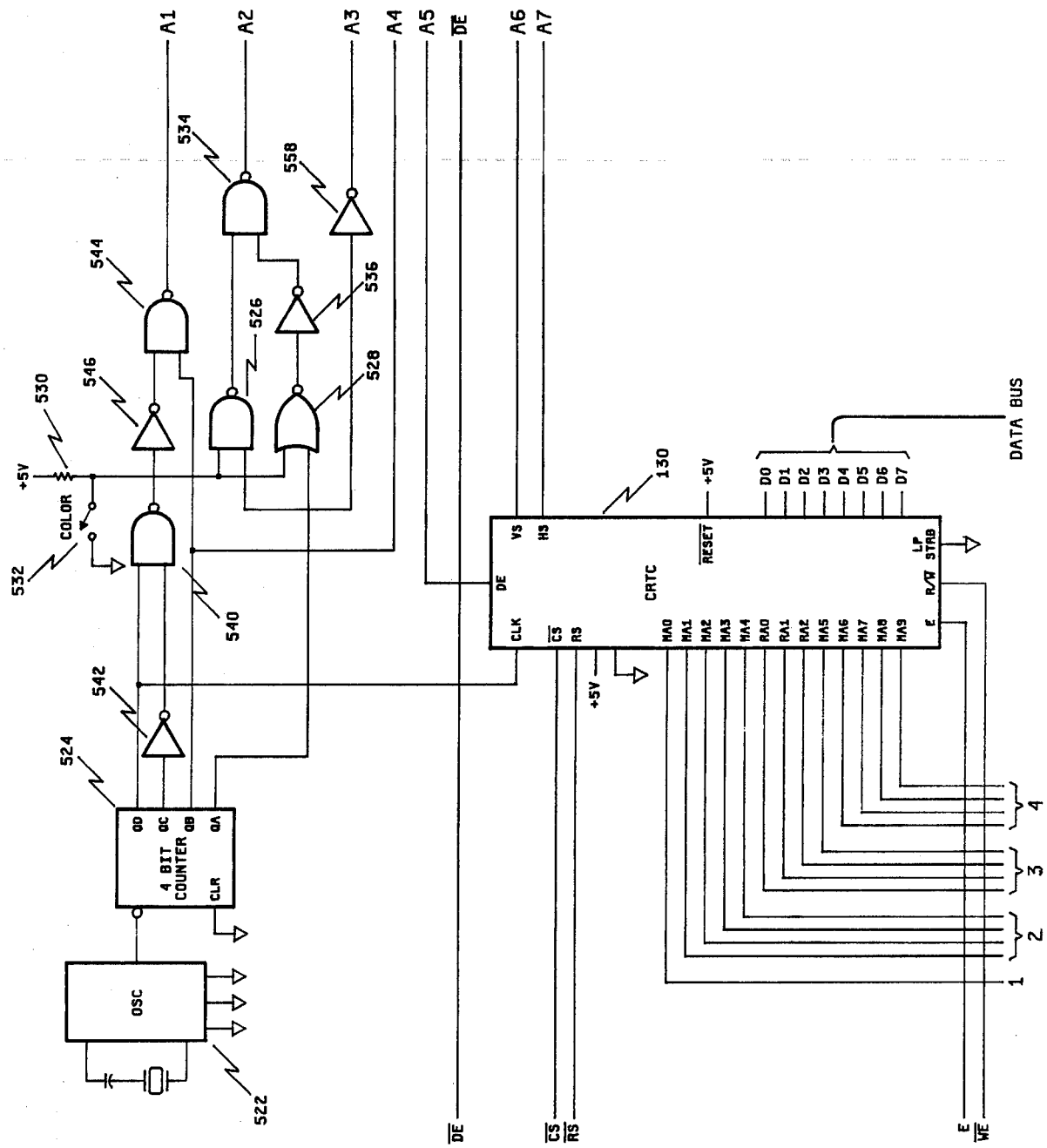
Figure 7L:
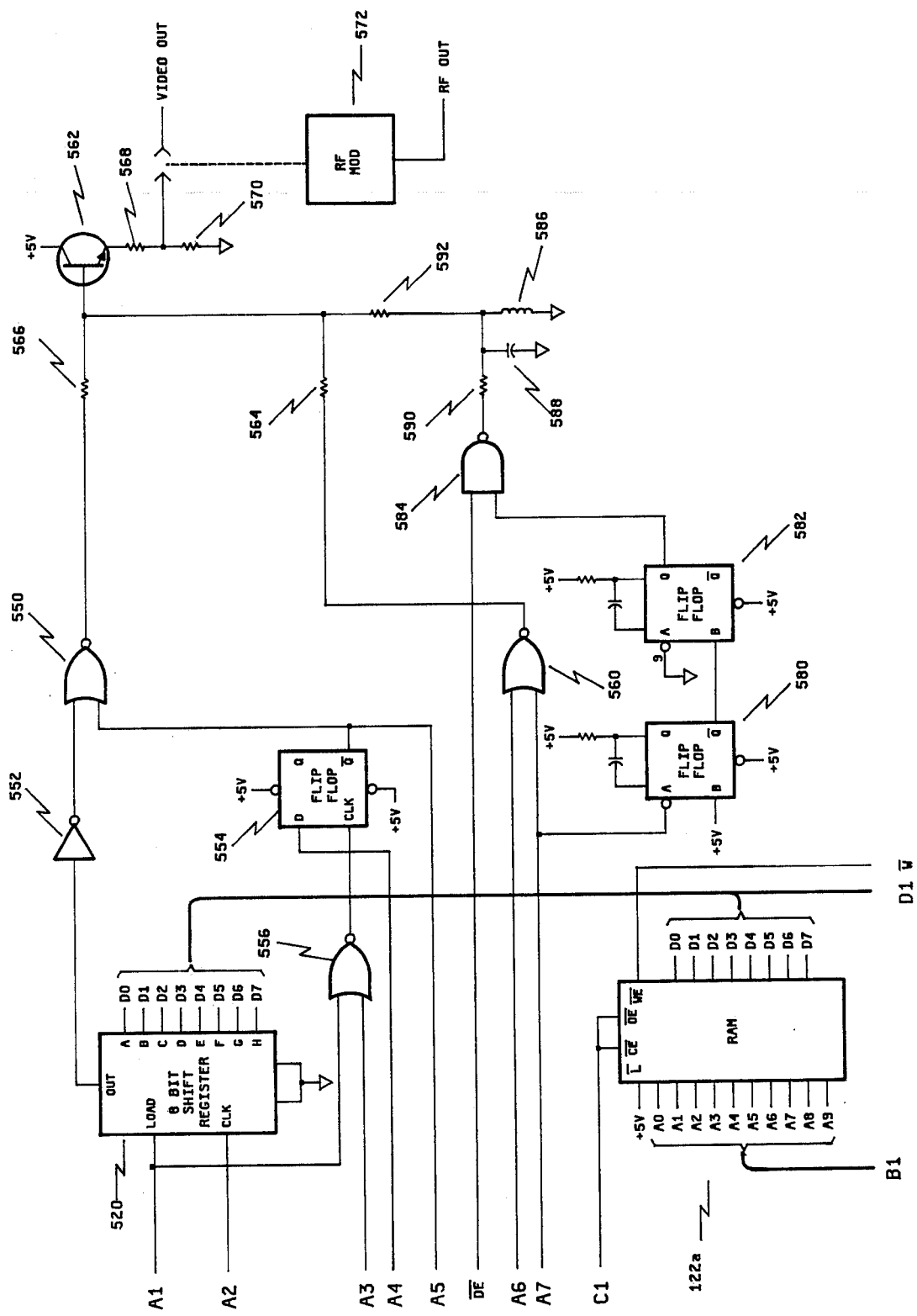
Figure 7J:
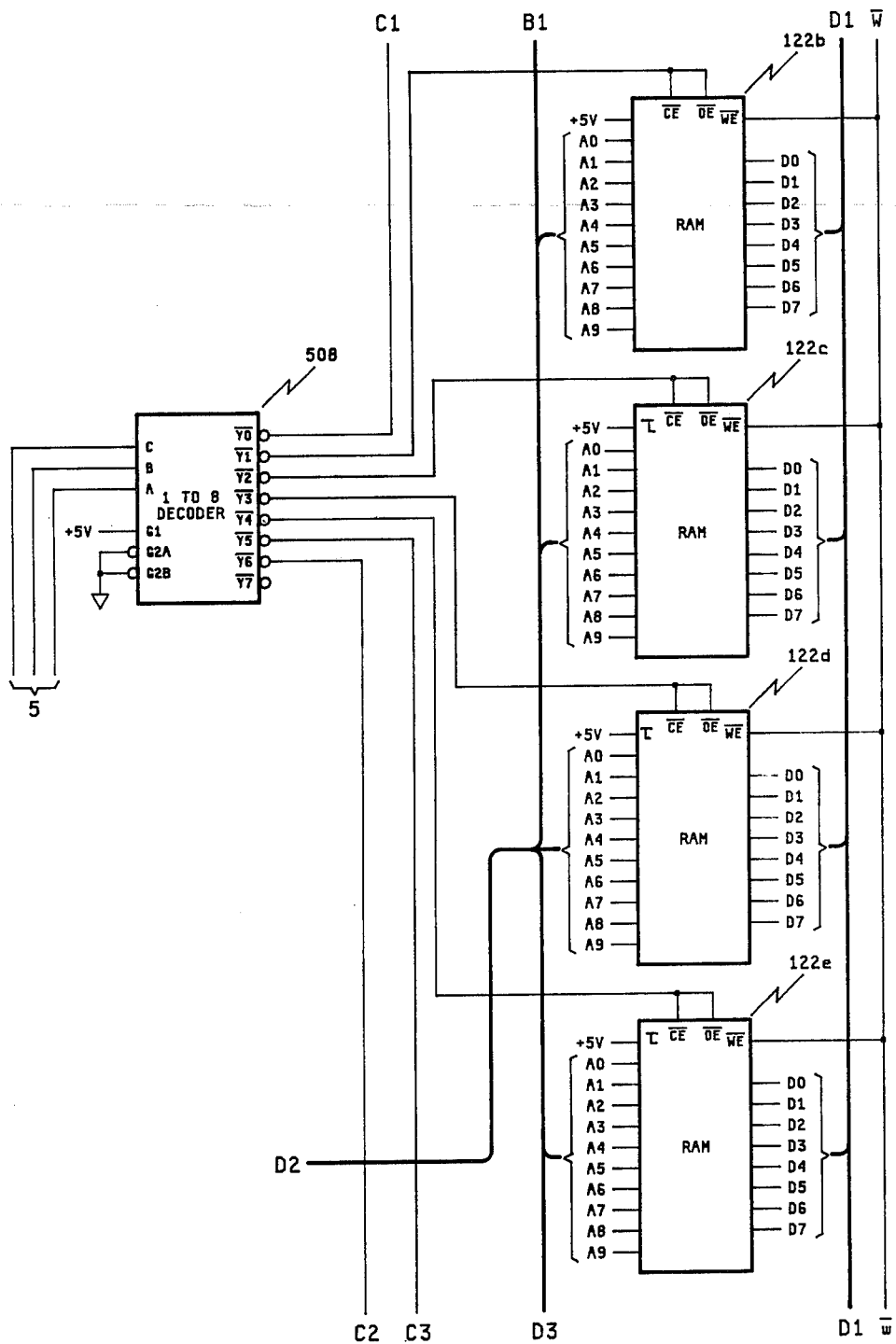
Figure 7K:
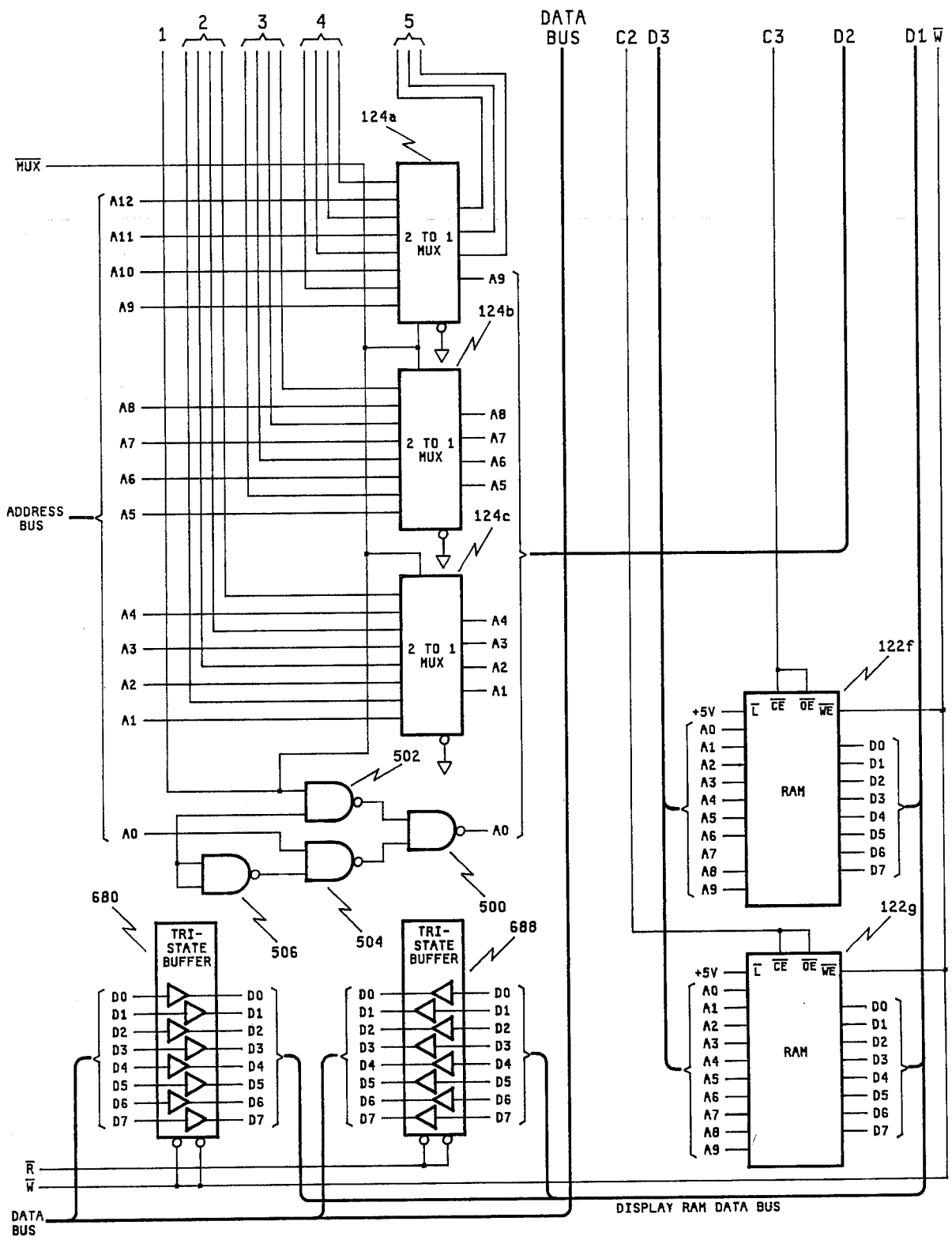

The multiplexer 24 is illustrated in further detail in FIG. 6. The multiplexer 24 includes a conventional multiplexer circuit 390 having a three-bit control input A, B, C which connect one of four input signals, video, HF test, CURB, CURA, to its output. The output of the multiplexer circuit 390 is applied to a driver 392 which generates a low-impedance output that is applied to the console unit through a slip ring 60 (FIG. 1). The signal-processing circuitry in the console unit 14, explained above with reference to FIG. 2, is illustrated in substantially greater detail in FIG. 7. The degree pulses from the optical sensor 40 (FIG. 1) are applied to the data input of a flip-flop 400, which is normally held high through resistor 420. The low at the data input to the flip-flop 400 is clocked to the Q output by pulses applied to the flip-flop 400 by the variable divider 98 through inverter 404. The high-to-low transition at the Q output of flip-flop 400 increments the degree counter 74 so that the eight-bit output of the counter 74 indicates the actual pointing angle of the antenna. The low-to-high transition at the $\overline{Q}$ output of the flip-flop 400 is also applied to the clock input of flip-flop 406, which has its data input normally held high through resistor 408. However, when the optical sensor 54 detects that the scanner unit 10 is positioned at zero degrees, the data input goes low, causing the $\overline{Q}$ output of flip-flop 406 to go high, thereby trigging one-shot 410. One-shot 410 then generates a short pulse which resets the degree counter 74. Thereafter, the degree counter 74 increments to 359 before it is once again reset by a pulse generated by the one-shot 410. The output of the degree counter 74 is applied to the data bus of the microprocessor 120 through a tri-state buffer 412 which is enabled by a decoder 414 from two bits of the address bus and the read output of the microprocessor 120. Thus, when the first two bits of the address bus go high and the microprocessor 120 generates a read command, the output of the degree counter 74 is presented to the data bus.

As mentioned above, the variable divider 98 receives the output of a stable oscillator 104 and generates an output having a frequency of which the frequency of the oscillator 104 is an integer multiple. The output of the oscillator 104 is applied to a J-K flip-flop 420 which toggles, thereby producing a symmetrical output having a frequency half that of the oscillator 104. The output of the flip-flop 420 is applied to the clock input of a counter 422 which generates a succession of outputs, each having a frequency of half the frequency of the adjacent output. All of the outputs from the counter 422 are applied to an eight-line to one-line multiplexer 424 which connects one of the inputs to its output, depending upon the value of a four-bit control input generated from the data bus by a pulse width and range latch 428. The latch 428 is clocked by a signal from the decoder 414, as explained above. The output of the multiplexer 424 is applied to a NOR-gate 430 which drives the flip-flop 400 through inverter 404. NOR-gate 430 also receives the output of the oscillator 104 from the NAND-gate 432 when NAND-gate 432 is enabled by the most significant bit of the control bus. NOR-gate 430 thus generates a pulse train having one of nine frequencies, as determined by a four-bit input to the multiplexer 424. Although the control signal to the multiplexer 424 is generated by the microprocessor 120, it is generated in accordance with the setting of a manually adjustable range selector 106 (FIG. 1).

The low-to-high transition at the output of flip-flop 400 occurring on each degree pulse is applied to the clock input of flip-flop 440, thereby generating a low-to-high transition at its Q output which triggers one-shot 442 after flip-flop 440 has been cleared by microprocessor 120 through decoder 414. One-shot 442 then generates a positive-going pulse which is inverted by inverter 444 to generate the negative-going magnetron trigger pulse. A magnetron trigger pulse is thus generated each time the optical sensor 40 determines that the scanner unit has moved one degree.

One-shot 442 also generates a negative-going pulse at its $\overline{Q}$ output which presets flip-flop 446. The Q output of flip-flop 446 then goes high, enabling NAND-gate 448 so that the pulse train from NOR-gate 430 is applied to NOR-gate 450, which, it is assumed, is enabled. J-K flip-flop 452 then toggles to generate an output which increments the return RAM address counter 100 (FIG. 2). When the counter 100 reaches 128, its $Q_c$ input goes high, thereby clocking a zero to the Q output of flip-flop 446, which disables NAND-gate 448. NOR-gate 450 thus generates 128 pulses upon the occurrence of each degree pulse at a rate determined by the selected range.

The pulses at the output of flip-flop 452 occur at a frequency which is higher than random access memories are able to handle. Consequently, the return RAM 94 is, in actuality, composed of two random access memories 94a and 94b which are alternately enabled. Accordingly, the output of flip-flop 452 is applied directly to the chip-select input of RAM 94a and to the chip-select input of RAM 94b through inverter 460. Similarly, the output of flip-flop 452 is applied directly to write enable NAND-gate 462, while the output of inverter 460 is applied to write enable NAND-gate 464. Thus a high at the output of flip-flop 452 enables RAM 94b and it also enables the NAND-gate 462 so that the high at the Q output of flip-flop 446 generates a low applied to the write enable input of RAM 94b. The data applied to the DIN input of RAM 94b is then written into the address location selected by the address from counter 100. At the same time, RAM 94a is disabled by the high at the output of flip-flop 452, and NAND-gate 464 is disabled by a low at the output of inverter 460. During the next cycle when the output of flip-flop 452 is low, RAM 94a and NAND-gate 464 are enabled, while RAM 94b and NAND-gate 462 are disabled.

The video data from the comparator 86 (FIG. 2) is applied to flip-flops 470,472, which are alternately preset by flip-flop 452. The output of the flip-flops 470,472 are applied to respective NOR-gates 474, 476. The NOR-gates 474,476 also receive the MUXOUT signal itself so that the outputs of the NOR-gates 474,476 can go high as soon as the MUXOUT line goes low, without waiting for the flip-flops 470,472 to change data. Very short MUXOUT pulses can thus be written into the memories 94a,b.

Reviewing the operation once again, upon the occurrence of each degree pulse, NAND-gate 448 applies 128 pulses to flip-flop 452 through NAND-gate 450. On the leading edge of the first pulse, counter 100 is reset and thereafter counts each of the 128 pulses in order to produce a sequentially increasing address for the return RAMS 94a,b. The RAMS 94a,b are then alternately enabled to record the video signal on the MUXOUT line until each RAM 94a,b has recorded sixty-four video signals. At that time, the $Q_c$ output of counter 100 goes high, clocking a zero to the output flip-flop 446 to disable NAND-gate 448. The period required for counter 100 to increment 128 is determined by the frequency of the pulses at the output of NAND-gate 430. A higher frequency causes the counter 100 to reach 128 sooner so that the data signals are recorded over a shorter period, and hence from targets within a smaller range. After 128 pulses have been counted by counter 100, the return RAMs 94a,b thus contain video signals from any and all targets within a predetermined range in a single direction.

The video signals in the RAMs 94a,b are read out of the RAMs 94a,b by the microprocessor 120, which applies appropriate signals to the decoder 414 to apply a pulse train to NAND-gate 450. NAND-gate 450 then accesses the RAMs 94a,b in the same manner as the pulses from NAND-gate 448. At the same time, a tristate buffer 480 is enabled to apply the data output lines of the RAMS 94a,b to the high-order bit of the data bus. The microprocessor 120 then calculates the proper location of each target return on the screen of the cathode ray tube.

The microprocessor 120 calculates the location in a video scan corresponding to each video signal and writes respective video display bits into even memory locations of the display RAM 122, which is composed of several random access memories 122a–g, as explained above with reference to FIG. 2. The address for the display RAM 122 is generated by the multiplexer 124, composed of several multiplexer circuits 124a–c and NOR-gates 500–506. The high-order address bits are applied to a one-of-eight decoder 508 whose outputs are connected to the chip-enable inputs of the RAMs 122a–g. The low-order address bits from the multiplexer 124a–c thus select the address in each of the RAMs 124a–g, while the high-order address bits enable one of the RAMs 122a–g. The microprocessor also writes video display bits into odd memory locations of the display RAM 122 which correspond to non-target data, such as range rings, center heading, antenna pointing angle, cursor and alpha numerics. As explained in greater detail below, the data bits recorded in even memory locations of the RAM 122 are displayed in one color while the data bits recorded in odd memory locations are displayed in another color. As a result, target returns are displayed in a different color from other data, and any overlap is displayed in white.

The multiplexers 124a–c receive two sets of address inputs. One set is generated by the CRTC 130, while the other set is generated on the address bus of the central processing unit 120. The multiplexer circuits 124a–c are controlled by the $\overline{\text{MUX}}$ signal, which, when high, connects the memory outputs of the cathode-ray tube controller to the RAMs 122a–g. When the MUX signal is low, the address of RAM 122 is selected by the central processing unit 120. NAND-gates 500—506 essentially select either the zero address bit of the CRTC 130 or the zero address bit of the microprocessor 120. Accordingly, when the $\overline{\text{MUX}}$ is high, NAND-gate 502 is enabled, while NAND-gate 504 is disabled through NAND-gate 506 acting as an inverter. Accordingly, the output of NAND-gate 504 is high, thereby enabling NAND gate 500 so that the zero-order address bit from the CRTC 130 is twice inverted before being applied to the zero address inputs of RAM 122. When the $\overline{\text{MUX}}$ line is low, NAND-gate 502 is disabled, thereby enabling NAND-gate 500 while NAND-gate 504 is enabled through NAND-gate 506 so that the zero address bit of the microprocessor 120 is twice inverted before being applied to the display RAM 122. The CRTC 130 reads data from the display memory 122 eight bits at a time by sequentially selecting addresses and generating write-enable signals for the RAM 122, as explained in greater detail hereinafter. The data is then read into a shift register 520, which receives eight clock pulses for each load pulse.

The clock and load pulses applied to the shift register 520 are generated by a coding circuit receiving a pulse train from an oscillator 522. The least significant bit from a counter 524, which is incremented by oscillator 522, is applied to NAND-gate 526 and NOR-gate 528, which are alternately enabled by the normally high input through resistor 530, which may be placed low by closing switch 532. Thus, when switch 532 is open, NAND-gate 526 is enabled, while NOR-gate 528 is disabled. Consequently, the pulses at the $Q_a$ output of counter 524 are applied to NAND-gate 534 through NAND-gate 526. NAND-gate 534 is then enabled by a high at the output of inverter 536. It should be noted that the pulses at the output of NAND-gate 534 are in phase with the pulses from the $Q_a$ output of counter 524. Closing of switch 532 disables NAND-gate 526 while enabling NOR-gate 528. The pulses from the $Q_a$ output of counter 524 are then applied to NAND-gate 534 through inverter 536. NAND-gate 534 is enabled by the high at the output of disabled NAND-gate 526. Note that the pulses at the output of NAND-gate 534 are out of phase with the pulses at the $Q_a$ output of counter 524 when switch 532 is closed. Switch 532 is thus opened or closed to control the phasing of the shift register 520 with respect to signals generated by the CRTC 130 in order to control the color of the display. Further, as explained above, since the data is read out of the display RAM 122 in serial, and since the clock is synchronized to a color-burst generator (explained below), the target data in odd addresses of RAM 122 are displayed in one color while the remaining data in even addresses of RAM 122 are displayed in a different color. This color combination can be reversed by actuating switch 532, which shifts the phase of the clock by 180 degrees. Target data overlapping non-target data causes the shift register 520 to generate a double-width pulse (since adjacent bits are both high) which is decoded by conventional video monitors as white. The $Q_c$ bit from counter 524 is applied to NAND-gate 540 through inverter 542, while the $Q_d$ output is applied directly to NAND-gate 540. NAND-gate 540 decodes the eight count of counter 524. The $Q_b$ output of counter 524 is applied to NAND-gate 544, which also receives the output of NAND-gate 540 through inverter 546. NAND-gate 544 thus generates a load pulse after every eight clock pulses in order to load the shift register 520 after all eight bits have been shifted from the shift register to NOR-gate 550 through inverter 522.

When the CRTC 130 is accessing the display RAM 122 or is shifting data from the shift register 520, its display-enable (DE) output is high so that a low is clocked to the Q output of flip-flop 554 whenever a clock pulse is generated at the output of NOR-gate 556. NOR-gate 556 is enabled at any time that data is not being loaded into the shift register 520 so that a clock pulse is produced through inverter 558 on the leading edge of any pulse at the $Q_a$ output of counter 524. Flip-flop 554 then enables NOR-gate 550 so that data from the shift register 520 can be applied to other circuitry.

The output of NOR-gate 550 is applied to a video multiplexer 126 which adds horizontal and vertical sync signals and a color burst to the data at the output of NOR-gate 550. Accordingly, the CRTC periodically generates either vertical or horizontal sync signals which are applied by NOR-gate 560 to the base of transistor 562 through resistor 564. Also, of course, the output of NOR-gate 550 is applied to the base of transistor 562 through resistor 566. Transistor 562 then couples any of these signals to voltage divider and impedance matching resistors 568,570 to produce a video output signal which may be applied directly to a video monitor or to an RF modulator 572 which generates an RF output that is compatible with commercially available television receivers. At the end of each horizontal scan, the horizontal sync pulse triggers one-shot 580, which, after a short delay, in turn triggers one-shot 582. The positive-going pulse at the output of one-shot 582 then enables NAND-gate 584, which applies a pulse at the $Q_e$ output of counter 524 through resistor 590 to a tank circuit consisting of inductor 586 and capacitor 588. The tank circuit then applies a sine wave to the base of transistor 562 through resistor 592 in order to provide a color-burst reference singla for color-decoding circuitry in the television receiver or video monitor.

As mentioned above, it is important for the microprocessor 120 to operate at as high a speed as possible, and this speed in excess of the speed capabilities of some of the components with which it interfaces. As a result, a wait-generator circuit 134 is provided to temporarily suspend operation of the microprocessor 120. The wait sequence is initiated at any time a memory-request (MREQ) signal is generated by the microprocessor 120. The negative-going memory-request pulse is applied to enabled NAND-gate 600, which applies a high to the data input of flip-flop 602. Upon the next clock pulse from the microprocessor clock, the Q output of flip-flop 602 applies a high to the data input of flip-flop 604, while the Q output of flip-flop 602 causes NOR-gate 608 to apply a high to NOR-gate 610, thereby generating a wait signal. Upon the next clock pulse, the high at the data input of flip-flop 604 is clocked to its output, thereby causing the output of NOR-gate 608 to go low to terminate the wait signal. A memory request generated by the microprocessor 120 thus produces a wait signal of one clock cycle in duration. This has the effect of increasing the output of the microprocessor 120 one clock cycle in order to give slower circuits sufficient time to react to the output.

A single clock-cycle wait signal is also produced when the chip-select input to the CRTC 130 goes low. More specifically, the CRTC 130 must be programmed by the processing unit 120 so that it will generate output signals in the proper sequence and timing. The microprocessor 120 initially generates a chip-select through one-of-eight decoder 414 which is applied to enabled NAND-gate 620. NAND-gate 620 then generates a positive-going pulse which is inverted by inverter 622 and applied to the chip-select input of CRTC 130. At the same time, the microprocessor generates a write enable (WE) which is applied to the write-enable input of CRTC 130 as well as a number on the data bus identifying an internal register of the CRTC 130 which is to be programmed. The microprocessor 120 then generates a register-select (RS) pulse through the $Y_7$ output of decoder 414, which is coupled through inverter 624. At the same time, a number is placed on the data bus which is written into the selected register. In the same manner, several internal registers of the CRTC 130 are programmed.

The programming of the CRTC 130 is fairly slow so that a wait must also be generated. Accordingly, the chip-select signal for the controller 130 is also applied to NAND-gate 600 and processed in the same manner as the memory request.

The CRTC is enabled by the Q output of flip-flop 602, clocking a high to the output of flip-flop 603. At the end of the chip-select signal for the CRTC 130, the flip-flop 603 is cleared through inverter 605, thereby disabling the programming of the CRTC 130.

The microprocessor 120 also generates memory-request pulses when it is accessing memory devices having sufficient speed to make the wait pulse unnecessary. However, the wait-generating circuitry is inhibited under these circumstances to prevent a wait signal from being generated. When the memory-request pulse is generated at the same time as the chip-enable for the program RAM 144, the chip-enable signal is applied to the reset input of flip-flop 602 to prevent the flip-flop 602 from responding to the high at the data input. Also, a memory request associated with the display RAM 122 is decoded by inverter 630 and NAND-gate 632 to preset flip-flop 604 so that its Q output remains high and thus disables NOR-gate 608. In summary, a single clock-cycle write pulse is generated whenever an internal register of the CRTC 130 is being programmed or whenever a memory device is being accessed other than the program RAM 144 or the display RAM 122.

As mentioned above with reference to FIG. 2, the operation of the microprocessor 120 must also be suspended when the microprocessor 120 requests access to the display RAM 122 while the display memory is being accessed by the CRTC 130. Accordingly, the low at the Q output of flip-flop 554, which is generated when the display-enable output of CRTC 130 goes high, enables NOR-gate 650. The low which occurs at the output of NAND-gate 632 whenever the microprocessor 120 requests access to the display RAM 122 places a high at the data input of flip-flop 652. Upon the next clock pulse from the microprocessor clock, a high is applied to NOR-gate 610, which produces a wait signal for as long as the microprocessor 120 is requesting access to the display RAM 122 or the CRTC 130 is active.

The low at the output of NAND-gate 632 when the microprocessor 120 requests access to the display memory 122 is also applied to the data input of flip-flop 654. Upon the next pulse from the microprocessor clock, a high is applied to NAND-gate 656, which, if enabled by a high at the $\overline{Q}$ output of flip-flop 652 (i.e., when the CRTC 130 is not active), generates a low at the output of NAND-gate 656. The low at the output of NAND-gate 656 switches the multiplexers 124a–c so that the address inputs to the display RAM 122 are connected to the address bus of the microprocessor 120.

The low at the output of NAND gate 632 when the microprocessor 120 is requesting access to the display RAM 122 also enables NOR-gates 670,672. When the microprocessor 120 is attempting to write data into the display RAM 122 as it calculates the proper position for each target in the video scan, the other input to NOR gate 672 goes low, thereby applying a high to NAND-gate 674, which, if the CRTC 130 is not active, is enabled by the high at the $\overline{Q}$ output of flip-flop 652. The write enable from the microprocessor 120 then enables NOR gate 676 so that flip-flop 678 is clocked upon the leading edge of the next clock pulse of the microprocessor clock. Flip-flop 678 then toggles, causing the Q output of flip-flop 678 to go low, which enables a tri-state buffer 680 and the display RAM 122. The data bus of the display RAM 122 is then connected to the data bus of the microprocessor 120, and data is written to the memory 122.

When the microprocessor 120 generates a read pulse, enabled NOR-gate 670 generates a positive-going pulse reflected as a negative-going pulse at the output of inverter 686. Inverter 686 then enables tri-state buffer 688, thereby connecting the data bus of the display RAM 122 to the data bus of the microprocessor 120.

The range control for the console unit 14 includes a single pole, nine-position rotary switch 700 which grounds one input to an eight-to-one encoder 702, normally held high through pull-up resistors 704. Similarly, the mode switch includes a single-pole, five-position switch 706 which grounds one of several input lines normally held high through resistors 708. The mode-input lines and the encoder outputs 702 are applied to a tri-state buffer 710 which connects its inputs to the data bus when enabled by a signal generated by the microprocessor through one-of-eight decoder 414. As mentioned above, the microprocessor 120 controls the width of the transmitted radar pulse and the frequency of the output from the eight-line-to-one-line multiplexer 424 in response to the range selection.

Another tri-state buffer 712 receives the vertical sync and display-enable signals from the CRTC 130 as well as a light-pen switch input normally held high through resistor 714 and a light-pen amplifier output. The buffer 712 also receives the output of a hysteresis circuit 716 having an input connected to resistor 718 and capacitor 720. The time constant of resistor 718 and capacitor 720 is fairly long so that the input to hysteresis circuit 716 remains high for power interruptions of fairly short duration. After a fairly short interruption, the microprocessor 120 examines the output of hysteresis circuit 716 to determine the length of the interruption. A fairly long interruption initiates a repowering-up sequence for the magnetron in order to prevent damage to the magnetron. The microprocessor 120 is reset by a negative-going pulse at the output of hysteresis circuit 722 generated by hysteresis inverter 724 because of the negative-going pulse coupled through capacitor 726 when the standby mode is initially selected. The input to hysteresis inverter 724 is normally held high through resistor 728.

Figure 8:
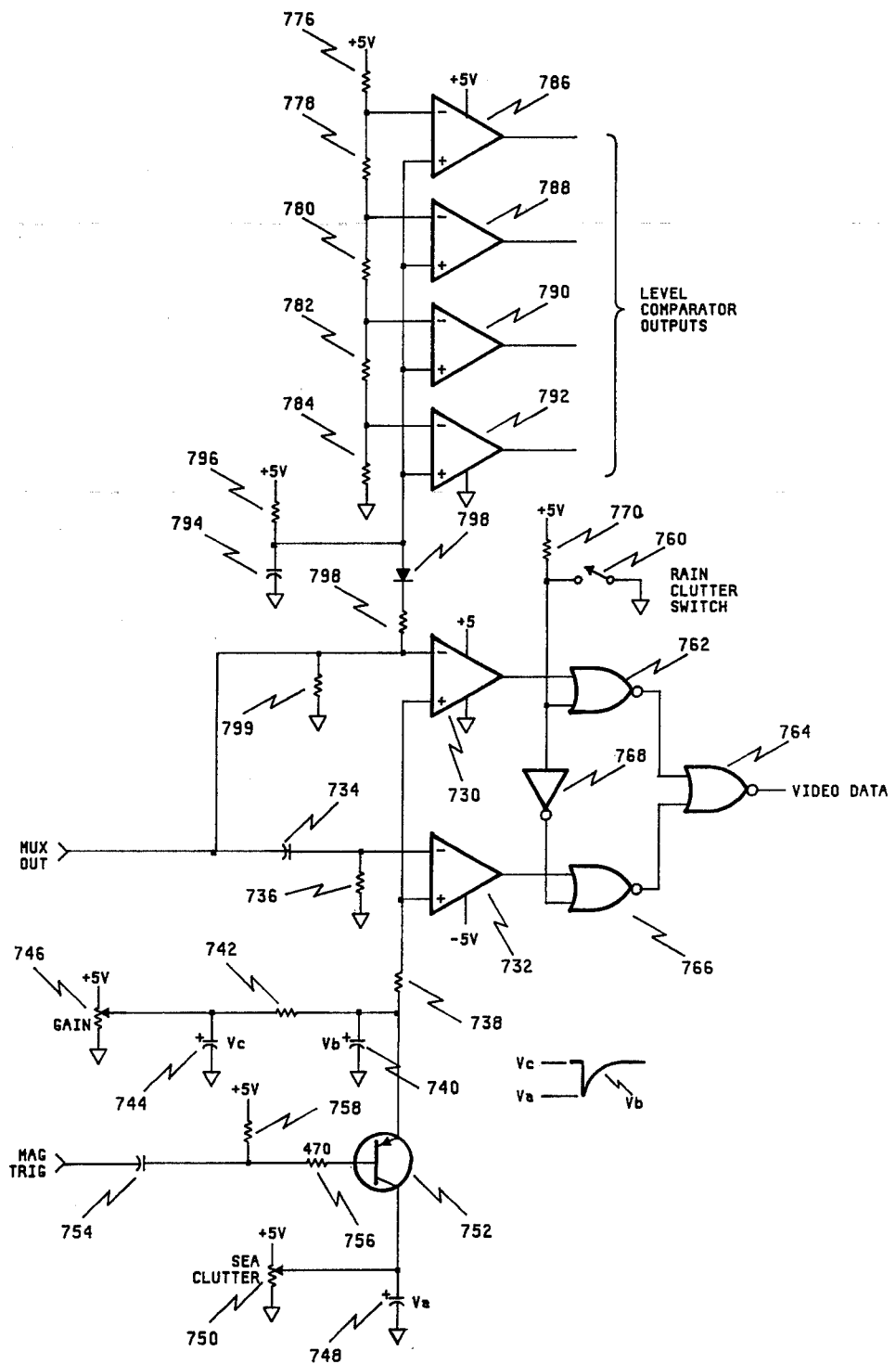
FIG. 8 is a schematic of a gain-adjusting and level-sensing circuit contained in the console unit.

The level sensor 80 and rain-clutter differentiator 82, discussed above with reference to FIG. 2, are illustrated in further detail in FIG. 8. The video signal from the scanner on the MUXOUT line is applied directly to the inverting input of comparator 730 and to the inverting input of comparator 732 through a differentiating circuit consisting of capacitor 734 and resistor 736. The positive inputs of the comparators 730,732 receive a comparison voltage through resistors 738. The comparison voltage is basically the voltage across capacitor 740, which charges through resistor 742 from capacitor 744. The voltage on capacitor 744 is set by the gain potentiometer 746. Similarly, the voltage across capacitor 748 is determined by the setting of sea-clutter potentiometer 750. The negative-going magnetron trigger pulse occurring 360 times per revolution of the scanner unit 10 is applied to the base of transistor 752 through capacitor 754 and resistor 756. Transistor 752 is normally held at cutoff through resistor 758. The magnetron trigger pulse saturates transistor 752, thus connecting capacitor 748 to capacitor 740. Since capacitor 748 is substantially larger than capacitor 740, the voltage across capacitor 740 immediately drops to the voltage across capacitor 748. Thereafter, capacitor 740 charges toward the voltage across capacitor 744. The comparison threshold is thus relatively high right after a radar pulse is transmitted but gradually decreases, thereby causing the gain of the circuit to increase with range.

The output of comparator 730 is a comparison between the comparison threshold and a signal proportional to the intensity of the target return. The output of comparator 732 is a comparison between the comparison threshold and the differential with respect to time of the target return. As mentioned above, the differential of a target return is often more visible than the actual return in a rainy environment because of the energy reflected by the rain. The output of either comparator 730,732 is selected by actuating a rain-clutter switch 760. When the rain-clutter switch is closed, NOR-gate 762 is enabled so that the output of comparator 730 is applied to NOR-gate 764. Meanwhile, NOR-gate 766 is disabled by a high at the output of inverter 768. The output of NOR-gate 764 is thus an indication of the actual target return. Closing switch 760 applies a high to NOR-gate 762 through resistor 770, thereby disabling NOR-gate 762 and enabling NOR-gate 766 through inverter 768. The output of comparator 732 is then applied to NOR-gate 764 so that the output of NOR-gate 764 is an indication of the change in intensity of the target return.

The video signal from the multiplexer is also applied to a level comparing circuit. Accordingly, voltage comparison resistors 776,778,780,782,784 generate respective comparison voltages for comparators 786,788,790,792. Power supply voltage is applied to a capacitor 794 through resistor 796, which tends to charge capacitor 794. However, capacitor 794 is discharged through diode 797 and resistors 798,799. The voltage to which capacitor 794 is discharged depends upon the average intensity of the target return. For relatively low target returns, the output of all comparators 786–792 will be negative. As the intensity of the target return increases, the outputs of successive comparators 786–792 will go positive. The microprocessor 120 periodically reads the outputs of the comparators 786-792 to measure the intensity of the target returns. The microprocessor 120 then generates a tuning bar on the screen of the cathode ray tube which is viewed while adjusting the turning potentiometer 230 (FIG. 3) to maximize the signal strength.

Figure 9:
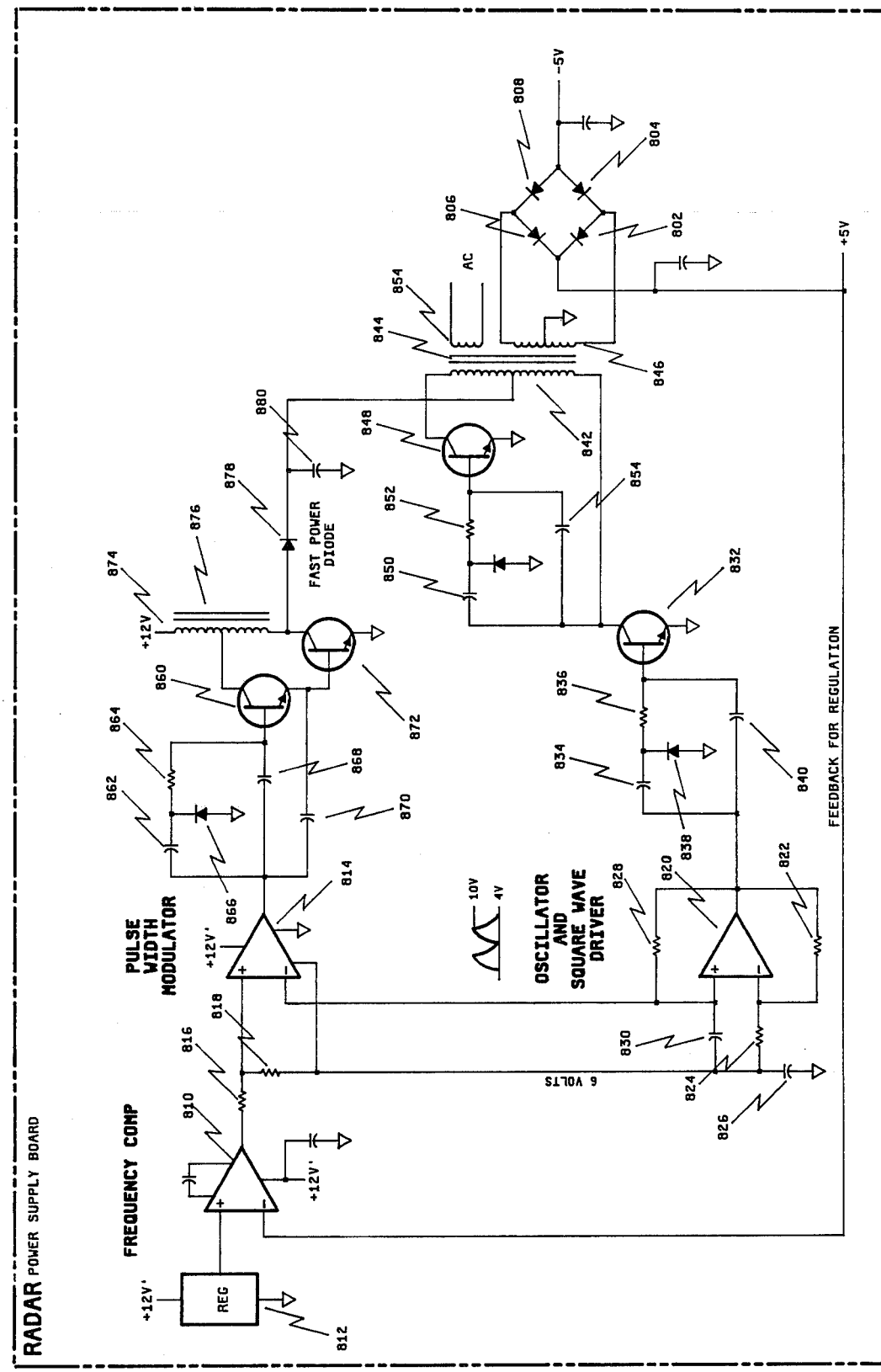
FIG. 9 is a schematic of a system power supply contained in the console unit.

The power supply in the console unit 14 is illustrated in FIG. 9. Basically, the power supply adjusts the pulse width of a signal applied to a transformer so that the rectified output from the transformer is equal to a precise reference voltage. Accordingly, the positive five-volt output from a bridge rectifier consisting of diodes 802,804,806,808 is applied to the negative input of a comparator 810. The positive input of the comparator 810 receives a reference voltage from a voltage regulator 812. As the output voltage from the power supply is decreased below the reference voltage, the output of comparator 810 thus increases. The output of comparator 810 is applied to a second comparator 814 through voltage divider resistors 816,818. The negative input to comparator 814 receives a triangular wave from an oscillator so that the output of comparator 814 switches when the triangular wave form from the oscillator reaches the pulse-width select voltage applied to the positive input of the comparator 814.

The oscillator includes a third comparator 820 having a pair of resistors 822,824 connected in voltage divider configuration to a fixed voltage across capacitor 826. The tap of the voltage divider between resistors 822,824 is connected to the positive input of the comparator 820. The voltage applied to the positive input of comparator 820 is thus some voltage between the fixed voltage across capacitor 826 and the voltage at the output of the comparator 820. Assuming that the voltage across capacitor 826 is six volts, for example, the voltage applied to the positive input of the comparator 820 may be three volts when the output of the comparator is zero and nine volts when the output of the comparator is twelve volts. The output of the comparator 820 is also connected to a series combination of resistor 828 and capacitor 830, with the tap between resistor 828 and capacitor 830 connected to the negative input of the comparator 820. Capacitor 830 thus charges toward a voltage equal to the output of the comparator 820. Assuming now, for example, that the output is zero volts and capacitor 130 is charged to six volts, capacitor 830 will begin discharging to zero. When the voltage across capacitor 830 reaches three volts, the output of comparator 820 switches to twelve volts, thereby applying nine volts to the positive input of the comparator 820 while allowing capacitor 830 to charge toward twelve volts. When the voltage across capacitor 830 reaches nine volts, the output of comparator 820 switches to zero volts, thereby applying three volts to the positive input of comparator 820 while allowing capacitor 830 to charge toward twelve volts. When the voltage across capacitor 830 reaches nine volts, the output of comparator 820 switches to zero volts, thereby applying three volts to the positive input of comparator 820 while allowing capacitor 830 to discharge toward zero volts. It is thus seen that a generally triangular wave form is produced at the negative input to the comparator 820 which varies between three and nine volts. At the same time, a square wave varying between zero and twelve volts is produced at the output of the comparator 820.

The square wave from comparator 820 is applied to the base of transistor 832 through capacitor 834 and resistor 836, which have a fairly long time constant. Diode 838 is provided to discharge capacitor 834 when the output of comparator 820 goes to zero, thereby potentially causing the other side of capacitor 834 to go negative. A final capacitor 840, having substantially less capacitance than capacitor 834, furnishes a low-impedance path to the base of transistor 832 at turn-on and turn-off.

When transistor 832 is turned on, current flows from the center tap of a primary winding 842 of transformer 844 to ground through transistor 832. A negative voltage is then produced on one lead of secondary winding 846, while the other lead of secondary winding 846 receives a positive voltage. At the same time, the collector of transistor 832 is also connected to the base of a second transistor 848 through capacitor 850, resistor 852, and capacitor 854, which function in the same manner as capacitor 834, resistor 836, and capacitor 840. The low voltage on the collector of transistor 832 maintains transistor 848 at cutoff. When transistor 832 cuts off, the relatively high voltage on the collector of transistor 832 is applied to the base of transistor 844, thereby turning on transistor 844 and causing current to flow from the center tap of the primary winding 842 to ground through transistor 848. Voltages are then produced on the winding of the secondary winding 846 which are opposite in polarity to the voltages produced when transistor 832 is saturated. Another secondary winding 854 generates alternating current for the power supply 26 in the scanner 10.

The amount of current flowing through the primary coil 842 of transformer 844 is determined by the voltage on the center tap of the primary coil 842. The power supply circuit thus adjusts the voltage on the center tap to maintain the output voltage applied to comparator 810 equal to the reference voltage from the regulator 812. The square wave at the output of comparator 814 is applied to the base of transistor 860 through capacitor 862 and resistor 864, which have a fairly long time constant. Diode 866 discharges capacitor 862 if the cathode of diode 866 goes negative. A relatively small capacitor 868 furnishes a low-impedance path to the base of transistor 860 at turn-on and turn-off, while a similar capacitor 870 furnishes a low-impedance path to the base of transistor 872. Capacitors 868,870, like capacitors 840,854, increase the switching speed of the transistors 860,872. When transistor 860 turns on, it draws current through the winding 874 of transformer 876 and also turns on transistor 872, which draws additional current through the winding 874. The average amount of current flowing the winding 874 is proportional to the duty cycle of the transistors 860,872. A higher duty cycle causes more current to flow through the winding 874 so that the transformer 876 produces a larger output voltage. The output voltage is applied through diode 878 to a filter capacitor 880 and the center tap of the primary winding 842 of transformer 844. The transistor configuration illustrated minimizes the collector emitter voltage of transistor 860 in order to minimize power dissipation.

When the feedback voltage from the power supply is above the reference voltage from regulator 812, the output of comparator 810 is reduced so that it is exceeded by the voltage from comparator 820 at an earlier time in the charging of capacitor 830. Consequently, the duty cycle of the signal at the output of comparator 814 is reduced, which causes the voltage at the output of the transformer 876 to be correspondingly decreased in order to bring the power supply voltage down to the proper level. The power supply thus generates accurate positive and negative supply voltage as well as alternating current while dissipating a minimum of power.

Figure 10A:
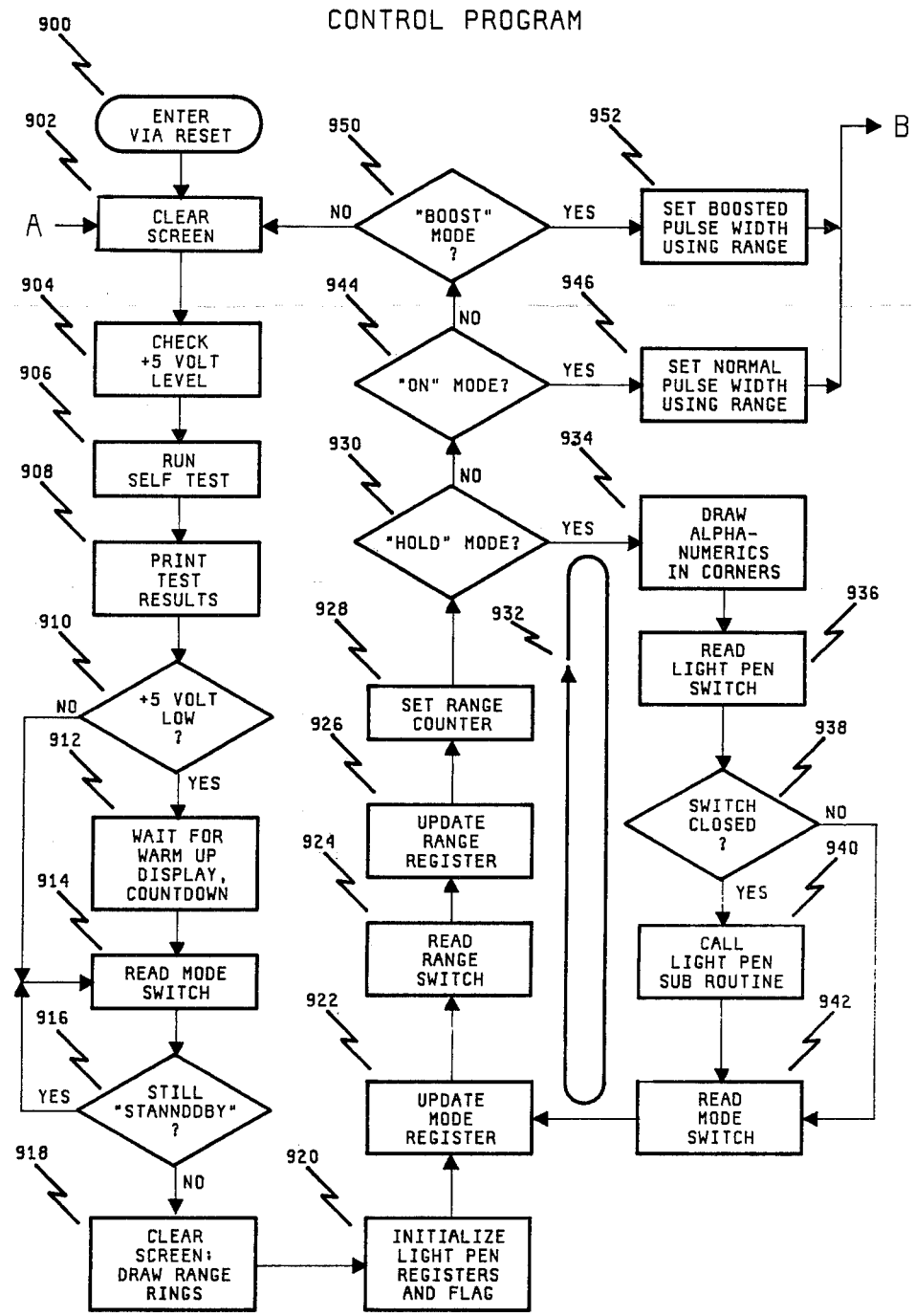
FIGS. 10a–10c comprise flow chart of the main program for controlling the operation of the radar system.
Figure 10B:
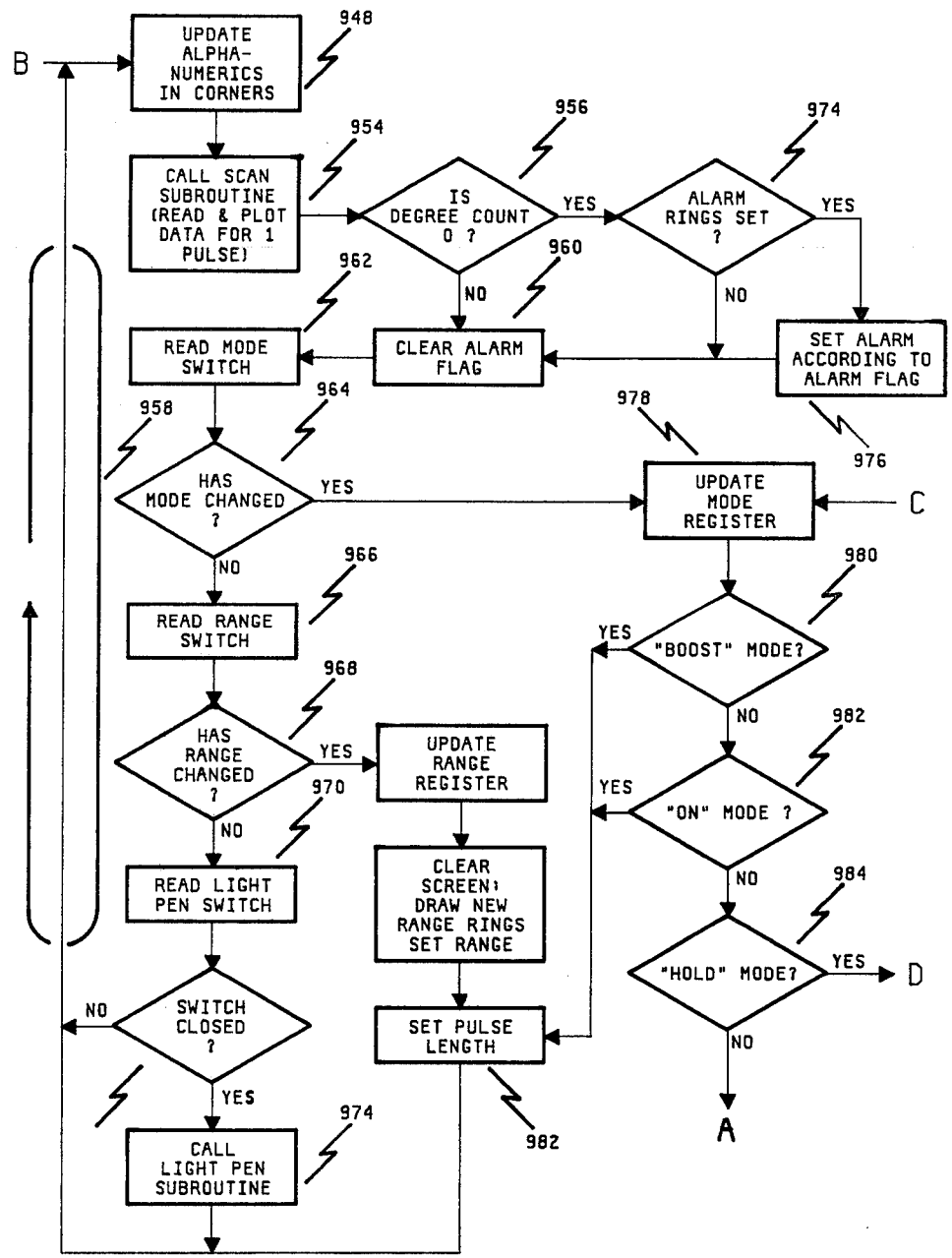
Figure 10C:
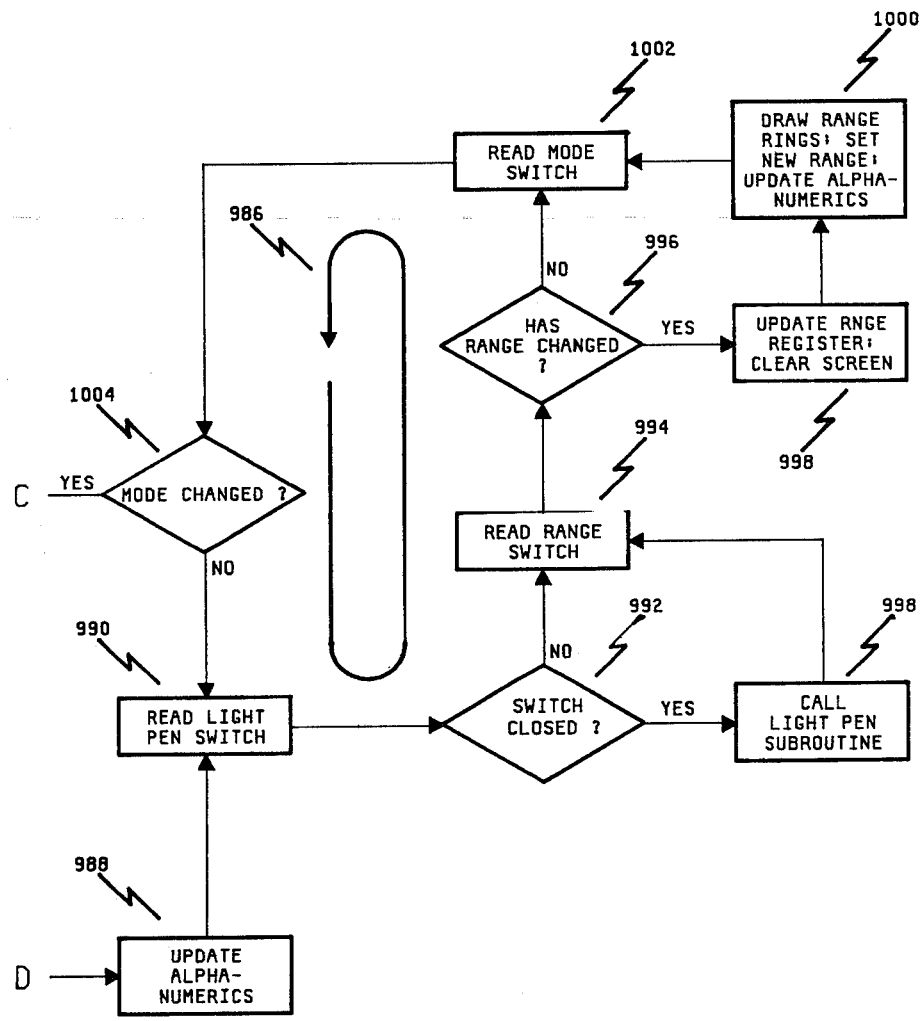

The flow chart for controlling the operation of the microprocessor 120 is illustrated in FIG. 10. The program is entered by being reset at 900 upon power-up of the system. The screen is initially cleared at 902 by erasing any spurious data in the display RAM 122. The microprocessor 102 then checks the supply voltage level on capacitor 720 (FIG. 7) to determine the length of a power-down. A power-down for longer than a predetermined period requires initialization of a power-up routine for the magnetron. A self-test routine is then run at 906, and the results printed at 908. The program tests at 910 whether the supply voltage was found to be low at 904. If the voltage was low, operation of the system is delayed at 912 for a predetermined period while the magnetron warms up. After the warmup period, the mode switch is read at 914. Also, if the power was not found to be low at 910, the program branches directly to 914.

From 914, the program tests for the standby mode at 916 and remains in a loop with 914 if the standby mode is still selected. When the mode switch is actuated out of the standby mode, the program clears the screen and draws range rings at 918 by entering video display signals in the display RAM 122 at the proper location so that the rings are produced when data is read out of the display RAM 122 during the scan. Light-pen registers and an internal flag are then initialized at 920, and a mode register 922 programmed with the operating mode is updated. The microprocessor then reads the range switch 700 by examining the data bus at the output of tri-state buffer 710 and updates a range register accordingly at 926. The microprocessor 120 then sets the range counter 424 (FIG. 7) at 928 so that a 128-pulse train of the proper frequency is applied to the RAM address counter 100. The program tests for the hold mode at 930 and, if present, enters a standby-hold loop 932. In the standby-hold loop, alphanumerics are drawn in the corner of the screen at 934 and the light-pen switch is read at 936. If the light-pen switch is closed as determined at 938, a light-pen subroutine is called at 940 before the mode switch is once again read at 942. If the light-pen switch is not found to be closed at 938, the program branches directly to 942.

If the mode-selector switch 206 is not on hold, the program tests for the "on" mode at 944. If the mode switch 206 has selected "on," the pulse width is set to a value determined by the range switch 100 by applying appropriate control inputs to the transmitter 20. The program then branches to 948, where the alphanumerics in the corners of the screen are updated.

If the system is not found to be in the "on" mode at 944, the program tests for the boost mode at 950. If in the boost mode, the pulse width of the transmission is set to a different value for the same range at 952 before updating the alphanumerics at 948. If the system is not found to be in the boost mode at 950, the program returns to 902 and progresses as explained above. The program then calls for a scan subroutine at 954, which is explained in greater detail hereinafter. The presence of the synchronizing pulse from sensor 54 is checked at 956, and if the pointing angle of the scanner unit 10 is not zero degrees, the program enters a run loop 958 by first clearing the alarm flag at 960 and once again reading the mode switch 706 at 962. Assuming that the program does not determine at 964 that the mode has changed, the range switch 700 is once again read at 966, and the program tests for a range change at 968. Assuming that the range has not changed, the light-pen switch is read at 970, and if the switch is found to be closed at 972, the program calls the light-pen subroutine at 974 before returning to update the alphanumerics at 948. If the switch is not closed, the program branches directly to 948. In the run loop 948, the program thus continuously examines various switches while plotting target returns.

When the synchronizing pulse is generated, it is detected at 956. The program then determines at 974 whether the alarm rings are set, and, if so, sets the alarm rings according to an alarm flag at 976. The program then returns to the run loop 958, as explained above.

If the program determines at 964 that the mode has changed, the mode register is updated at 978 and the program tests for the boost mode at 980. If in the boost mode, the pulse length is set at 982. Otherwise, the mode switch 706 is examined for being "on" at 982 and the hold mode is examined at 984. If the system is found to be in the hold mode, the pulse length is set at 982 and the program once again enters the run loop 958. If the system is in the hold mode, a hold loop 986 is entered in which the alphanumerics are updated at 988, the light-pen switch is read at 990, and the condition of the light-pen switch is tested at 992. If the switch is not closed, the range switch 700 is read at 994 before testing the mode switch at 996. If the switch is closed, the light-pen subroutine is called at 998 before reading the range switch at 994. If the range switch is found at 996 to have changed, the range register is updated at 998 and the screen is cleared, new range rings and new range alphanumerics are displayed at 1000, and the mode switch is once again read at 1002. The program then tests for a changed mode at 1004 and remains in the hold loop 986 if the mode has not changed. If the program determines at 1004 that the mode has changed, the mode register is updated at 978 and the modes are tested as explained above.

Figure 11A:
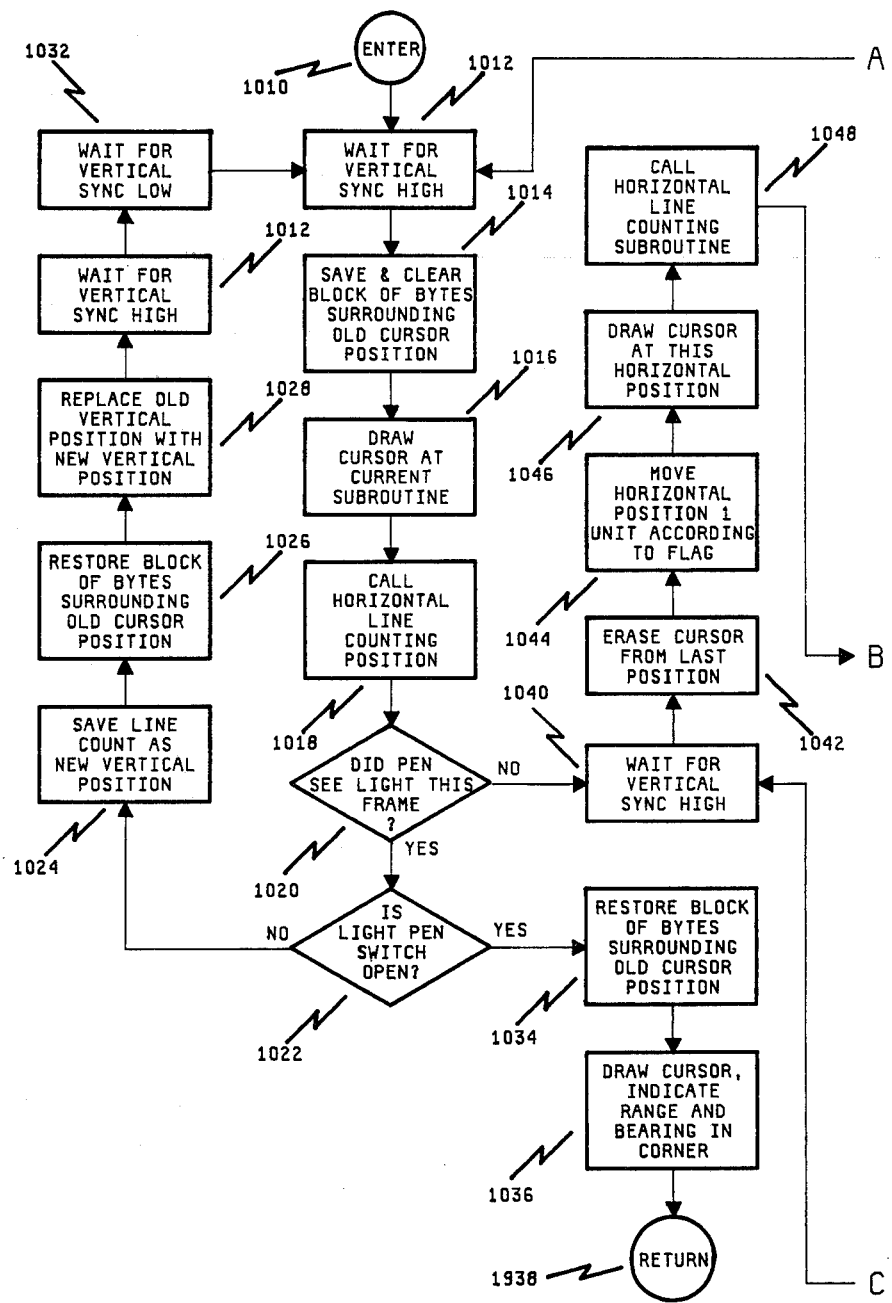
FIGS. 11a–11c comprise a flow chart of a light-pen subroutine that is called by the main program shown in FIG. 10.
Figure 11B:
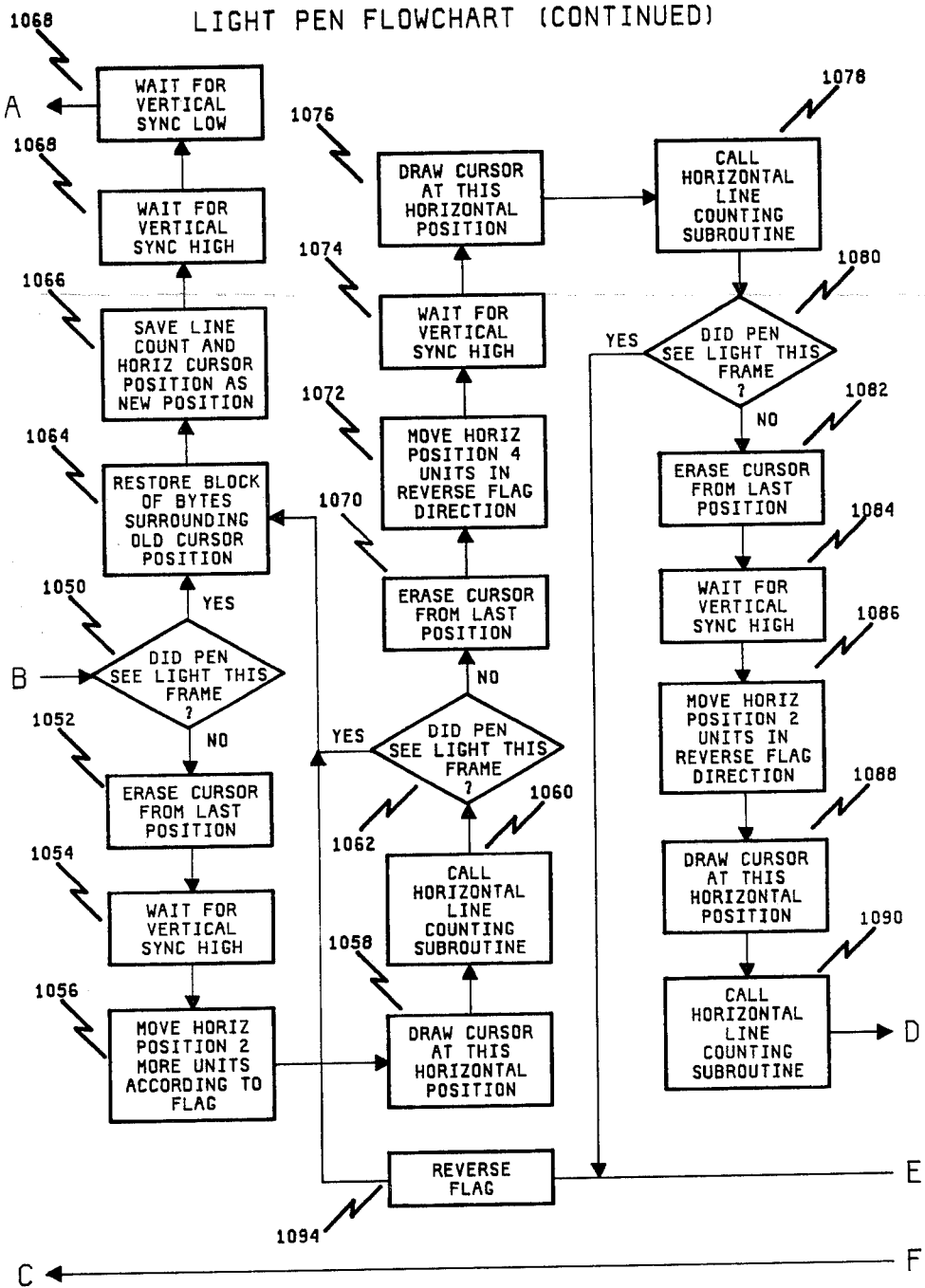
Figure 11C:
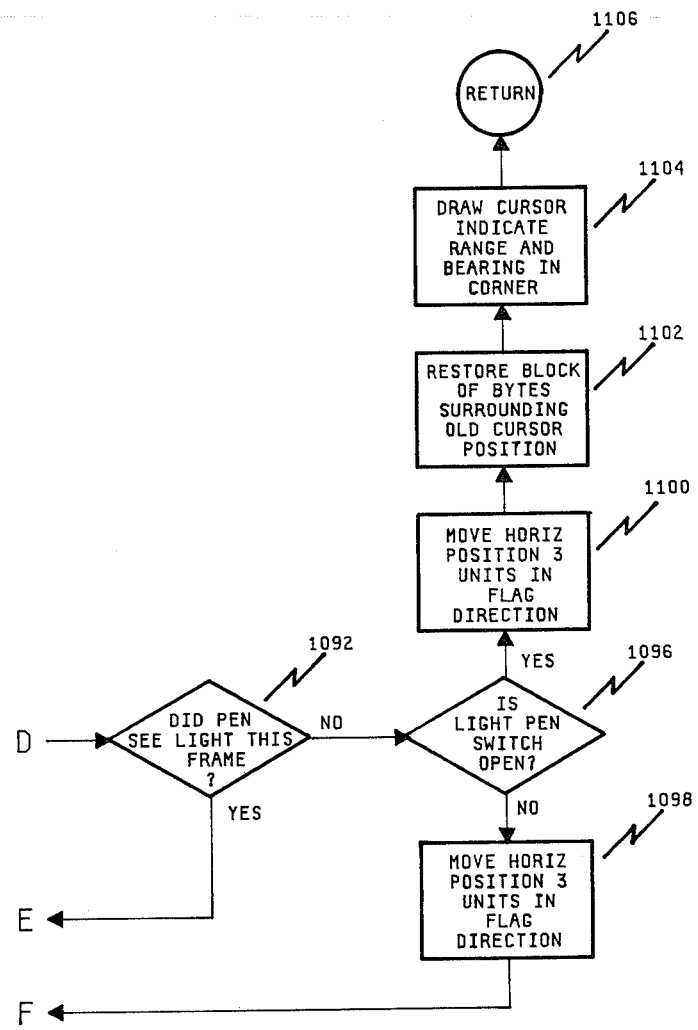

The light-pen subroutine, called by the control program of FIG. 10, is illustrated in FIG. 11. The program is entered at 1010 and waits at 1012 until the vertical sync signal goes high. The program then progresses to 1014, where it saves and clears video display data in the display memory 122 surrounding the memory address where the display signals for the present cursor position are located. A cursor is then drawn at the current position at 1016, and a line-counting subroutine is called at 1018, where the line in which the video scan was seen by the light detector is counted to determine the vertical position of the cursor.

The program determines whether the light pen saw light during the previous scan at 120 and, if so, tests to see whether the light-pen switch is open at 1022. If the light-pen switch is still closed, the line count determined at 1018 is saved at 1024 and the block of bytes in display RAM 122 which were cleared at 1014 is restored at 1026. The previous vertical position is then replaced with the new vertical position at 1028, and the CRTC 130 is examined at 1030 for the vertical sync output to go high. The program then waits at 1032 for the vertical sync output to go low and remains in the loop until the light-pen switch is found to be open at 1022 or the program determines at 1020 that the light pen did not see the scan for the previous frame.

Assuming the light-pen switch is found to be open at 1022, the block of bytes in the display RAM 122 surrounding the old cursor position is restored at 1034, the cursor and range and bearing information is displayed at 1036, and the program returns to the control program at 1038.

As explained earlier, the light-pen circuitry does not move the cursor by detecting the time at which the light pen detects the scan. To do so would require extremely fast, and hence complex and expensive circuitry. Instead, the system need only determine the line in which the scan was detected. The horizontal tracking system assumes that the user starts out by pointing the light pen at the cursor's initial position. Changes in the horizontal position in that line is then determined moving the cursor horizontally in a fairly slow search pattern of two positions in each direction until the light detector senses the cursor. The vertical position of the cursor is thus determined in the horizontal line-counting subroutine 1018. However if the light pen does not detect the cursor, as determined at 1020, the program branches to 1040, where it waits for a vertical sync signal from the CRTC 130. The program then erases the cursor from the last position at 1042 and moves it horizontally one unit at 1044 in the aforementioned search pattern. At 1046, the cursor is drawn at the new horizontal position; and the line-counting subroutine is called at 1048. If the program determines at 1050 that the light pen did not see the scan, the light pen is not located at the new horizontal position. Accordingly, the cursor is erased from the last position at 1052 and it waits for a new vertical sync signal at 1054. The cursor position is then moved two more units at 1056, and the cursor is drawn at the new position at 1058. The horizontal line-counting subroutine is called at 1060, and the program once again determines at 1062 whether the light pen saw the scan.

Returning momentarily to the test of 1050, if the light pen did see the scan at the new horizontal position, the block of bytes in the display RAM surrounding the old cursor position is restored at 1064 and the new line count and horizontal cursor position are recorded at 1066. The program then waits for a vertical sync signal at 1068 and, when a vertical sync low is detected at 1068, once again branches to 1012.

If the program determines at 1062 that the light pen did not see the scan, the cursor is erased from its last position at 1070 and the cursor position is moved four units in the opposite direction to the previous movement at 1072. The program waits at 1074 for a vertical sync signal and then draws the cursor at the new horizontal position at 1076 before once again calling the line-counting subroutine at 1078. If the program determines at 1062 that the light pen did see the scan, the program once again branches to 1064, as described above.

After the horizontal line-counting subroutine is called at 1078, the program tests at 1080 to determine if the light pen saw the scan at the new horizontal location. If not, the cursor is erased from the last position at 1082, it waits for a vertical sync signal at 1084, and a new horizontal position is selected two units in reverse of the previous direction at 1086. The cursor is then drawn at 1088 at its new location, and the line-counting subroutine is called at 1090. The scan is once again tested at 1092; and if the scan was detected by the light pen, the program branches to 1094, where the flag is reversed so that the search pattern moves in the opposite direction during a subsequent search. If the light pen was not found at 1092 to have seen the scan, the light-pen switch is examined at 1096. If the light-pen switch is not open yet, the cursor is moved horizontally three units, according to the reversed flag at 1098, and the program branches to 1040, where the same sequence is repeated in the reverse direction by virtue of the flag reversal at 1094.

If the program determines at 1096 that the light-pen switch is now open, the cursor is moved horizontally three units at 1100, the block of bites surrounding the old cursor position in the display RAM is restored at 1102, the cursor and range and bearing markings are drawn on the screen at 1104, and the program returns to the main control program at 1106.

Figure 12:
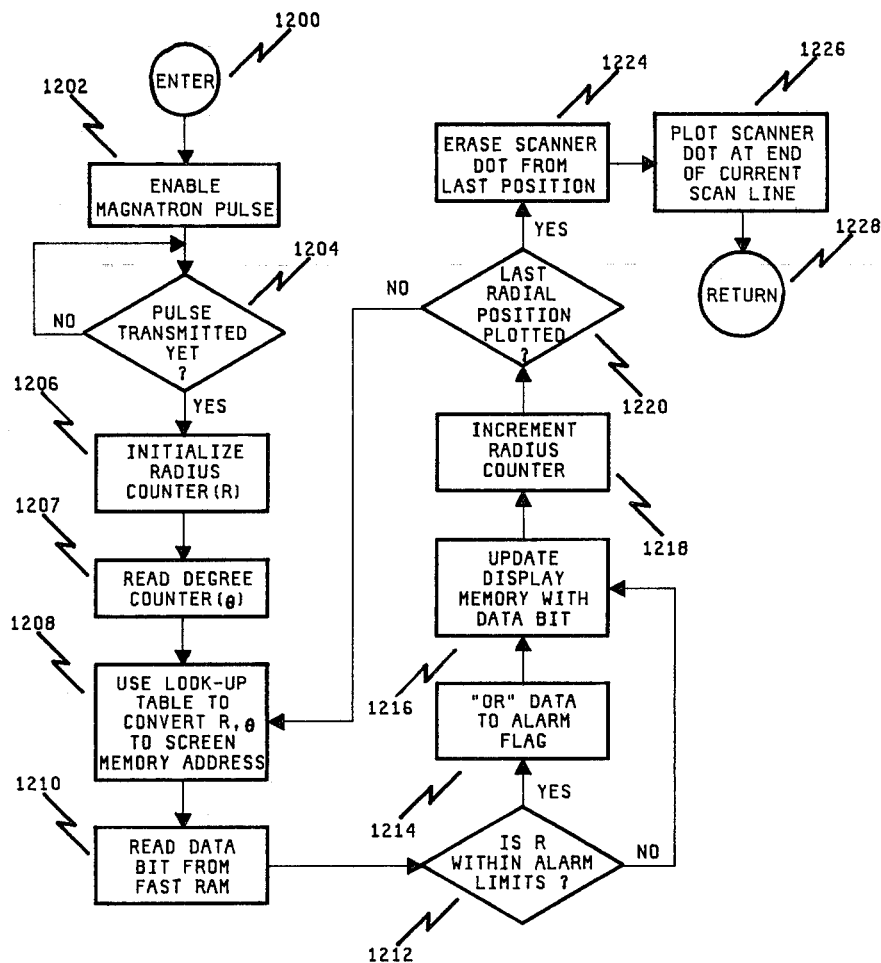
FIG. 12 is a flow chart of a scan subroutine that is called by the main program shown in FIG. 10.

The scan subroutine entered through the main control program of FIG. 10 is illustrated in FIG. 12. The program is entered at 1200, and the microprocessor enables the circuitry to generate a magnetron trigger pulse at 1202. The system waits at 1204 for a magnetron pulse to be transmitted, and when that occurs, the program initializes the radius counter 100 at 1206. The degree counter 100 is then read at 1207, and a look-up table is consulted at 1208 to convert the range and bearing information of each target in the return RAM 94 to the proper address of the display RAM 122. The data from the return RAM 94 is then read at 1210 and the program checks at 1212 to determine whether the target is within the alarm ring. If so, an alarm flag is set at 1214 before the display memory is updated at 1216. If a target is not within the alarm limits, the program branches directly from 1212 to 1216. The degree counter 100 is incremented at 1218; and if the counter 100 is not determined at 1220 to be at 128, the program returns to 1208. The program thus remains in loop 1222 until 128 video data signals have been read from the return RAM 94 and corresponding video display signals have been read into the display RAM 122. When the program determines at 1220 that the 128th radial position has been plotted, the program erases a scanner dot from the previous position at 1224. The scanner dot is a dot plotted around the periphery of the screen which indicates the pointing angle of the scanner 10. The scanner dot for the new radial position of the scanner is then plotted at 1226 before returning to the main control program at 1228.

Figure 13:
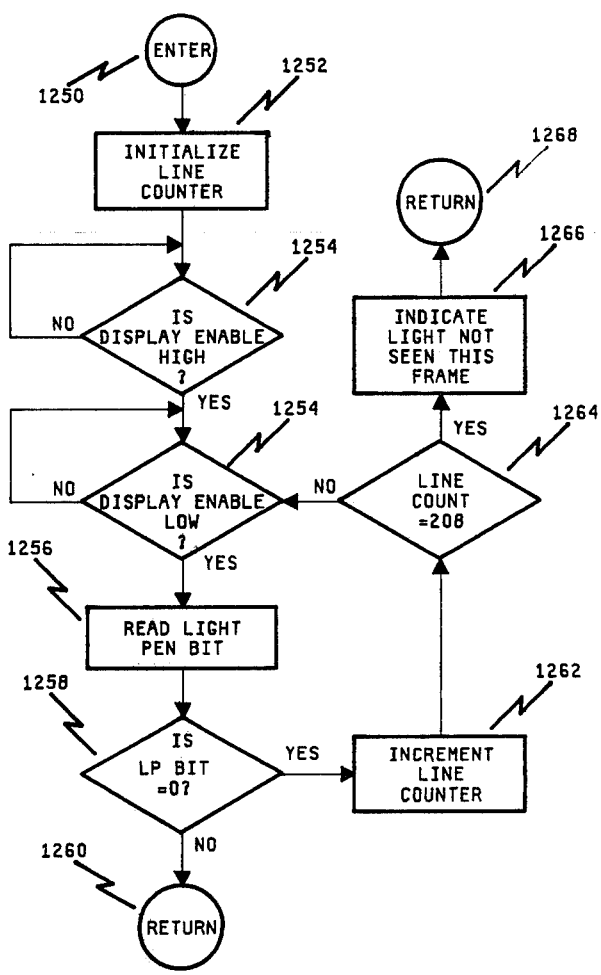
FIG. 13 is a flow chart of a line-counting subroutine that is called by the main program shown in FIG. 10.

The line-counting subroutine called in the main control program and explained above with reference to FIG. 10, is illustrated in FIG. 13. The subroutine is entered at 1250 and the line counter is initialized at 1252. The program remains in a loop at 1254 until display-enable goes high, at which it checks at 1254 for display-enable to go low. The microprocessor 120 then reads the light-pen output at 1256 on the data bus; and if the light-pen bit is found to be high, the subroutine returns to the main program at 1260.

If the light-pen bit is found to be zero at 1258, the line counter is incremented at 1262 and, if the line count is not found at 1264 to be equal to the bottom line, returns to 1254. Otherwise, the program records that the light was not seen this frame at 1266, before returning to the main control program at 1268. The light-counting subroutine thus checks for the scan to be seen each line and indicates whether the light has been seen at any time during that line.

We claim:
1. A radar system for continuously displaying targets on a screen of a cathode-ray tube, comprising:
   a scanner unit having a directional antenna, transmitter means powered by a relatively high voltage and being coupled to said antenna for transmitting a pulse of RF energy from said antenna responsive to a transmitter trigger signal, receiver means connected to said antenna for generating a video signal responsive to said antenna receiving RF signals reflected by said targets, and a self-contained, high-voltage power supply which generates said high voltage from low-voltage power applied to said scanner through a pair of conventional low-voltage slip rings, thereby eliminating the need for rotary RF connectors and high-voltage slip rings;

means for rotating said scanner unit;

position transducer means for generating position signals indicative of the rotational position of said scanner unit;

trigger means for selectively generating said transmitter trigger signals;

first memory means for recording said video signals for a predetermined period after each transmitter trigger signal such that said memory means contains a binary signal corresponding to each target within a predetermined range in a single direction;

second memory means for recording video display signals in respective memory locations identified by corresponding address words;

processing means receiving the contents of said first memory means, calculating the position of each target on said screen, and generating for each target a video display signal and a respective address word identifying the address in said second memory means corresponding to the location in a cathode-ray tube scan which places said target at the calculated position on said cathode-ray tube as said cathode-ray tube is scanned such that said second memory means records the video display signals resulting from a plurality of transmitted trigger signals; and cathode-ray tube controller means for periodically reading said video display signals from said second memory means in a predetermined order and adding vertical and horizontal synchronizing signals to said display signals, thereby generating a video output signal which may be applied to a conventional television monitor to cause said monitor to continuously display the locations of said targets.

2. A radar system for continuously displaying targets on a screen of a cathode-ray tube, comprising:

a scanner unit having a directional antenna, transmitter means coupled to said antenna for transmitting a pulse of RF energy from said antenna responsive to a transmitter trigger signal and receiver means connected to said antenna for generating a video signal responsive to said antenna receiving RF signals reflected by said targets, said scanner means being powered by a plurality of diverse supply voltages and said scanner unit including a self-contained, multi-voltage power supply which generates said supply voltages from low-voltage power applied to said scanner unit through a pair of conventional low-voltage slip rings, thereby eliminating the need for a large number of slip rings to supply all of said supply voltages;

means for rotating said scanner unit;

position transducer means for generating position signals indicative of the rotational position of said scanner unit;

trigger means for selectively generating said transmitter trigger signals;

first memory means for recording said video signals for a predetermined period after each transmitter trigger signal such that said memory means contains a binary signal corresponding to each target within a predetermined range in a single direction;

second memory means for recording video display signals in respective memory locations identified by corresponding address words;

processing means receiving the contents of said first memory means, calculating the position of each target on said screen, and generating for each target a video display signal and a respective address word identifying the address in said second memory means corresponding to the location in a cathode-ray tube scan which places said target at the calculated position on said cathode-ray tube as said cathode-ray tube is scanned such that said second memory means records the video display signals resulting from a plurality of transmitted trigger signals; and cathode-ray tube controller means for periodically reading said video display signals from said second memory means in a predetermined order and adding vertical and horizontal synchronizing signals to said display signals, thereby generating a video output signal which may be applied to a conventional television monitor to cause said monitor to continuously display the locations of said targets.

3. A radar system for continuously displaying targets on a screen of a cathode-ray tube, comprising:

a scanner unit having a directional antenna, transmitter means coupled to said antenna for transmitting a pulse of RF energy from said antenna responsive to a transmitter trigger signal and receiver means connected to said antenna for generating a video signal responsive to said antenna receiving RF signals reflected by said targets;

means for rotating said scanner unit;

position transducer means for generating position signals indicative of the rotational position of said scanner unit;

trigger means for selectively generating said transmitter trigger signals;

first memory means for recording said video signals for a predetermined period after each transmitter trigger signal such that said memory means contains a binary signal corresponding to each target within a predetermined range in a single direction;

second memory means for recording video display signals in respective memory locations identified by corresponding address words;

processing means receiving the contents of said first memory means, calculating the position of each target on said screen, and generating for each target a video display signal and a respective address word identifying the address in said second memory means corresponding to the location in a cathode-ray tube scan which places said target at the calculated position on said cathode-ray tube as said cathode-ray tube is scanned such that said second memory means records the video display signals resulting from a plurality of transmitted trigger signals;

cathode-ray tube controller means for periodically reading said video display signals from said second memory means in a predetermined order and adding vertical and horizontal synchronizing signals to said display signals, thereby generating a video output signal which may be applied to a conventional television monitor to cause said monitor to continuously display the locations of said targets; and a light pen having a light detector generating an output signal while said light detector is adjacent a portion of the screen of a cathode-ray tube that is being scanned, and wherein said processing means determines when in said scan said output signal is detected, calculates the location of said screen that said light detector is adjacent, and records in said second memory means video display signals and respective address words identifying the locations in said second memory means corresponding to portions of said scan which will place a cursor on said cathode-ray tube adjacent said light detector, said processing means determining the position of said light detector by counting the lines of said scan occurring before said scan is detected by said light detector to determine the position of said cursor in a direction perpendicular to said lines and, if said light detector does not sense said cursor after a predetermined scan duration, shifting said cursor in a second direction, orthogonal to said first direction, until said light detector senses said cursor.

4. A rotatably mounted scanner unit for a radar having a directional antenna, transmitter means powered by a relatively high voltage coupled to said antenna for applying pulsed RF energy to said antenna, receiver means coupled to said antenna for generating a video signal responsive to said antenna receiving RF energy reflected by a target, and self-contained power supply means generating said high voltage from low-voltage power applied to said scanner unit through a pair of conventional low-voltage slip rings, thereby eliminating the need for rotary RF connectors and high-voltage slip rings.

5. A rotatably mounted scanner unit for a radar having a directional antenna and a plurality of electronic components powered by a plurality of diverse supply voltages, said scanner unit further including a self-contained, multi-voltage power supply which generates said supply voltage from low-voltage power applied to said scanner unit through a pair of conventional low-voltage slip rings, thereby eliminating the need for a large number of slip rings to supply all of said supply voltages.

* * * * *